United States Patent
Watanabe et al.

(10) Patent No.: US 6,321,533 B1
(45) Date of Patent: Nov. 27, 2001

(54) EXHAUST PASSAGE SWITCHING UNIT AND METHOD FOR INTERNAL COMBUSTION ENGINE

(75) Inventors: Takashi Watanabe; Koichi Hoshi, both of Susono; Kazuhiro Sakurai, Gotenba, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/576,210

(22) Filed: May 23, 2000

(30) Foreign Application Priority Data

May 24, 1999 (JP) ................................... 11-143210
Mar. 24, 2000 (JP) ................................... 12-085369

(51) Int. Cl.⁷ ..................................................... F01N 7/00
(52) U.S. Cl. ................................ 60/324; 60/274; 60/277; 60/287
(58) Field of Search ..................... 60/274, 277, 287, 60/288, 324, 602; 123/564, 568.16, 568.29, 568.31

(56) References Cited

U.S. PATENT DOCUMENTS

| | | | |
|---|---|---|---|
| 3,779,222 | * 12/1973 | Lorenz | 123/568.29 |
| 3,794,006 | * 2/1974 | Woodward | 60/277 |
| 3,937,194 | * 2/1976 | Tamaki et al. | 123/568.15 |
| 4,779,423 | * 10/1988 | Szczupak | 60/602 |
| 5,271,228 | * 12/1993 | Kawakami | 60/602 |
| 5,309,887 | * 5/1994 | Kondo et al. | 123/568.16 |
| 5,337,725 | * 8/1994 | Narita | 123/568.16 |
| 5,349,936 | * 9/1994 | Uchinami | 123/568.16 |
| 5,635,633 | * 6/1997 | Kadota | 123/568.16 |
| 5,852,929 | * 12/1998 | Kato et al. | 60/277 |
| 6,182,445 | * 2/2001 | Yamazaki et al. | 60/277 |

FOREIGN PATENT DOCUMENTS 08334014    12/1996    (JP).

* cited by examiner

Primary Examiner—Thomas Denion
Assistant Examiner—Tu M. Nguyen
(74) Attorney, Agent, or Firm—Olff & Berridge, PLC

(57) ABSTRACT

A hydrocarbon adsorption apparatus is provided in an exhaust passage of an internal combustion engine. The hydrocarbon adsorption apparatus is equipped with a main passage, a switching valve for opening and closing the main passage, and a bypass passage for bypassing the main passage. The switching valve is coupled to a diaphragm of a diaphragm mechanism. A variable chamber in the diaphragm mechanism is connected to an intake manifold through a negative pressure feed line and a vacuum switching valve. When the vacuum switching valve is turned on, a negative pressure is supplied to the variable pressure chamber so that the diaphragm is deflected. In response to the deflection of the diaphragm, the switching valve is closed. The state of the switching valve is judged based on a tendency of changes in pressure of the negative pressure feed line when the vacuum switching valve is turned on.

17 Claims, 13 Drawing Sheets

TURN VSV ON

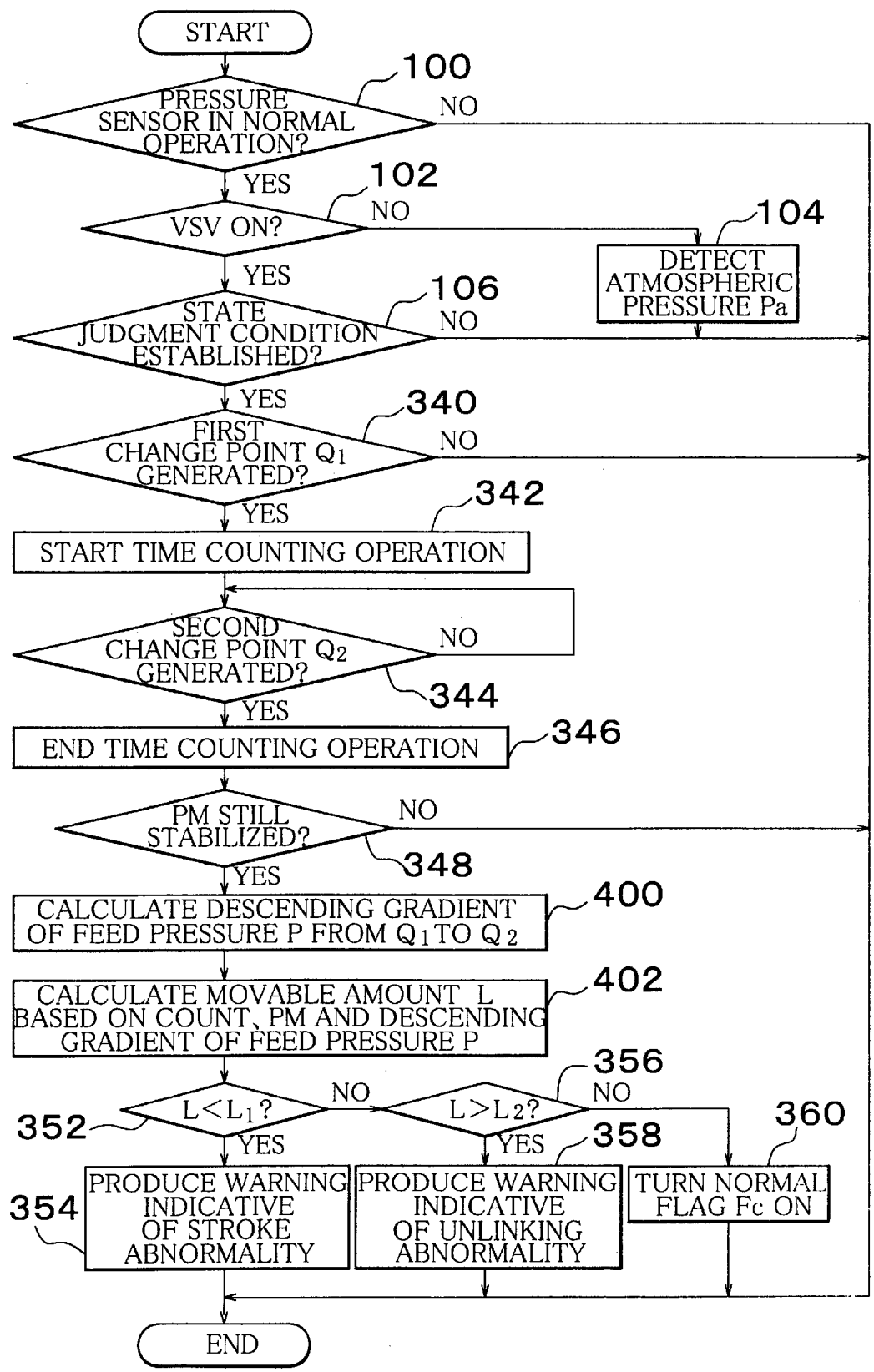

EXHAUST PASSAGE SWITCHING UNIT AND METHOD FOR INTERNAL COMBUSTION ENGINE

INCORPORATION BY REFERENCE

The disclosures of Japanese Patent Application Nos. 11-143210 filed on May 24, 1999 and 2000-85369 filed on Mar. 24, 2000 including the specifications, drawings and abstracts are incorporated herein by reference in their entireties.

BACKGROUND OF THE INVENTION

1. Field of Invention

The present invention relates to an exhaust passage switching unit and method for an internal combustion engine and, more particularly, to an exhaust passage switching unit and method capable of precisely judging the state of a switching mechanism for switching an exhaust passage.

2. Description of Related Art

Exhaust passage switching units as disclosed, for example, in Japanese Patent Application No. 8-334014 have been known. A switching unit of this type is equipped with a switching valve which switches exhaust gases to a main exhaust passage in which a catalyst is disposed or to a bypass passage. In an operating state with a high rotational speed and a high load, deterioration caused by overheating of the catalyst is prevented by switching the exhaust passage to the bypass passage.

When the main exhaust passage serves as the exhaust passage, the flow resistance of the exhaust passage increases because of the resistance of the catalyst. If the flow resistance of the exhaust passage increases, the negative pressure in an intake pipe decreases accordingly. Hence, according to the switching unit of the related art, it is determined, based on a change in negative pressure in the intake pipe when a switching signal is supplied to the switching valve, whether or or the exhaust passage has been switched, that is, whether or not the switching valve is in normal operation.

However, the negative pressure in the intake pipe changes depending not only on a flow resistance of the exhaust passage but also on an operating state of the internal combustion engine. Thus, it is difficult to distinguish between a change in negative pressure in the intake pipe caused by the switching of the exhaust passage and a change in negative pressure in the intake pipe caused by an operating state of the internal combustion engine. The method in the aforementioned switching unit of the related art does not necessarily permit precise judgment of an operational state of the switching valve.

SUMMARY OF THE INVENTION

It is an object of the invention to provide an exhaust passage switching unit for an internal combustion engine which permits precise judgment of the state of a switching mechanism for switching an exhaust passage.

In a first aspect of the invention, an exhaust passage switching unit for an internal combustion engine comprises a switching mechanism which has a moving member driven by a fluid pressure and a pressure transmitting portion for transmitting a fluid pressure of a fluid pressure source to the moving member, wherein the switching member switches an exhaust passage in accordance with a movement of the moving member, a transmitting portion pressure detector that detects a pressure of the pressure transmitting portion, a controller that determines a state of the switching mechanism based on a pressure detected by the transmitting portion pressure detector.

In the first aspect of the present invention, the pressure transmitting portion transmits a fluid pressure to the moving member. The moving member is driven by the fluid pressure transmitted by the pressure transmitting portion, whereby the exhaust passage is switched. If a fluid pressure in the fluid pressure source is supplied to the pressure transmitting portion, the pressure in the pressure transmitting portion changes towards the pressure in the fluid pressure source. In this case, the volume in the pressure transmitting portion changes in accordance with an amount of movement of the moving member, whereby the pressure in the pressure transmitting portion also changes. That is, the change in pressure of the pressure transmitting portion reflects an operating state of the moving member. Thus, the controller can determine a state of the switching mechanism based on a pressure in the pressure transmitting portion detected by the transmitting portion pressure detector.

In the case where the switching mechanism is in normal operation, while the moving member moves in the course of a change in pressure of the pressure transmitting portion towards the pressure in the fluid pressure source, the volume of the pressure transmitting portion changes in such a direction as to attenuate changes in pressure therein. As a result, the absolute value of a gradient of changes in pressure decreases. On the contrary, if the switching mechanism is locked, the moving member does not move. Therefore, the aforementioned change in gradient of changes in pressure does not occur.

In the first aspect of the present invention, the controller may judge presence or absence of locking of the switching mechanism based on whether or not there is a period when an absolute value of a gradient of changes in pressure detected by the transmitting portion pressure detector becomes equal to or smaller than a predetermined value within a predetermined period after start of a switching operation of the exhaust passage by the switching mechanism.

The controller may judge presence or absence of locking of the switching mechanism based on whether or not there is a period when an absolute value of a change amount of a gradient of changes in pressure detected by the transmitting portion pressure detector becomes equal to or smaller than a predetermined value within a predetermined period after start of a switching operation of the exhaust passage by the switching mechanism.

If the switching mechanism is locked, the volume of the pressure transmitting portion changes depending on the locking position of the switching mechanism. In this case, the gradient of changes in pressure at the time of supply of a fluid pressure of the fluid pressure source to the pressure transmitting portion changes in accordance with a volume of the pressure transmitting portion.

Thus, in the aforementioned aspect, if it is determined that the switching mechanism is locked, the controller may determine a locking position of the switching mechanism based on a gradient of changes in pressure detected by the transmitting portion pressure detector.

If there arises a malfunction such as pressure leakage in the pressure transmitting portion, the pressure in the pressure transmitting portion does not reach the pressure in the fluid pressure source.

Thus, in the first aspect of the present invention, the controller may be constructed to judge presence or absence of a malfunction in the pressure transmitting portion based on a pressure detected by the transmitting portion pressure detector after lapse of a predetermined length of time since start of a switching operation of the exhaust passage by the switching mechanism.

While the moving member moves in the course of a change in pressure of the pressure transmitting portion towards the pressure in the fluid pressure source, the volume of the pressure transmitting portion changes in such a direction as to attenuate changes in pressure therein. As a result, the absolute value of the gradient of changes in pressure decreases. That is, the absolute value of a change amount of the gradient of changes in pressure increases. If the moving member has moved to its maximum after a decrease in absolute value of the gradient of changes in pressure, the volume of the pressure transmitting portion does not change afterwards. As a result, the absolute value of the gradient of changes in pressure increases. That is, the absolute value of the change amount of the gradient of changes in pressure increases.

Thus, in the aforementioned aspect, the may be constructed controller to determine an amount of movement of the moving member based on a period from a moment when an absolute value of a change amount of a gradient of changes in pressure detected by the transmitting portion pressure detector becomes equal to or greater than a first predetermined value after start of a switching operation of the exhaust passage by the switching mechanism to a moment when the absolute value becomes equal to or greater than a second predetermined value.

In the course of a change in pressure of the pressure transmitting portion towards the pressure in the fluid pressure source, the period required for the absolute value of the gradient of changes in pressure to increase after its decrease changes in accordance with the pressure in the fluid pressure source.

Thus, in the aforementioned aspect, the exhaust passage switching unit may comprise a fluid pressure source pressure detector or that detects a pressure of the fluid pressure source. Also, the controller may be constructed to determine an amount of movement of the moving member based on a pressure detected by the fluid pressure source pressure detector.

In the course of a change in pressure of the pressure transmitting portion towards the pressure in the fluid pressure source, the absolute value of the gradient of changes in pressure changes, after its decrease, in accordance with a magnitude of friction of the switching mechanism.

Thus, in the aforementioned aspect, the controller may determine a magnitude of friction of the switching mechanism based on a gradient of changes in pressure detected by the transmitting portion pressure detector after an absolute value of a change amount of a gradient of changes in the pressure becomes equal to or greater than a predetermined value since start of a switching operation of the exhaust passage by the switching mechanism.

In the course of a change in pressure of the pressure transmitting portion towards the pressure in the fluid pressure source, the period required for the absolute value of the gradient of changes in pressure to increase after its decrease changes in accordance with a magnitude of friction generated in the switching mechanism.

Thus, in the aforementioned aspect, the exhaust passage switching unit may comprise a friction detector that detects a friction of the switching mechanism. Also, the controller may determine an amount of movement of the moving member based on a magnitude of the friction detected by the friction detector.

In the course of a change in pressure of the pressure transmitting portion towards the pressure in the fluid pressure source, the period required for the absolute value of the gradient of changes in pressure to increase after its decrease changes in accordance with a magnitude of friction caused by thermal expansion of the switching mechanism.

Thus, in the aforementioned aspect, the exhaust passage switching unit may comprise a temperature detector that detects a temperature of the switching mechanism. Also, the controller may determine an amount of movement of the moving member based on a temperature detected by the temperature detector.

In the case where the switching mechanism is in normal operation, the amount of movement of the moving member is confined to a predetermined range. On the contrary, if there arises a malfunction such as unlinking between the moving member and the member for switching the exhaust passage, the amount of movement of the moving member may exceed the predetermined range.

Thus, in the aforementioned aspect, the controller may judge presence or absence of a malfunction in the switching mechanism based on whether or not an amount of movement of the moving member is equal to or greater than a predetermined threshold value.

In the course of a change in pressure of the pressure transmitting portion towards the pressure in the fluid pressure source, there arises a phenomenon wherein the absolute value of the gradient of changes in pressure increase after its decrease. If a long period of time elapses until emergence of the phenomenon wherein the absolute value of the gradient of changes in pressure increases after its decrease, it can be determined that the amount of movement of the moving member is great and that there is a malfunction such as unlinking of the switching mechanism between the moving member and the member for switching the exhaust passage.

Thus, in the first aspect of the present invention, the controller judge presence or absence of a malfunction in the switching mechanism based on an elapsed time after an absolute value of a change amount of a gradient of changes in pressure detected by the transmitting portion pressure detector becomes equal to or greater than a predetermined value since start of a switching operation of the exhaust passage by the switching mechanism.

In the course of a change in pressure of the pressure transmitting portion towards the pressure in the fluid pressure source, the pressure at the beginning of a decrease in absolute value of the gradient of changes in pressure changes in accordance with a magnitude of friction generated in the switching mechanism. If the absolute value of the pressure is great, there may arise a circumstance where the pressure is unable to change towards the pressure in the fluid pressure source. In this case, it is possible to determine that there is a malfunction resulting from friction of a great magnitude in the switching mechanism.

Thus, in the first aspect of the present invention, the controller may judge presence or absence of a malfunction in the switching mechanism based on a pressure detected by the transmitting portion pressure detector when an absolute value of a change amount of a gradient of changes in pressure detected by the transmitting portion pressure detector becomes equal to or greater than a predetermined value after start of a switching operation of the exhaust passage by the switching mechanism.

In the case where the intake passage of the internal combustion engine serves as the fluid pressure source for transmitting a fluid pressure to the moving member, the internal pressure of the intake passage (hereinafter referred to as an intake pressure) changes in accordance with an operating state of the internal combustion engine. The pressure in the pressure transmitting portion changes in accordance with an intake pressure. Hence, if the intake pressure fluctuates, the pressure in the pressure transmitting portion fluctuates accordingly. For this reason, the state of the switching mechanism cannot precisely be judged based on the pressure in the pressure transmitting portion.

Thus, in the first aspect of the present invention, the fluid pressure source may be designed as an intake passage of the internal combustion engine. Also, the controller may judge the instability of an internal pressure of the intake passage based on an operating state of the internal combustion engine. Further, if the controller determines that an internal pressure of the intake passage is stabilized, the controller may judge a state of the switching mechanism based on a pressure detected by the transmitting portion pressure detector.

BRIEF DESCRIPTION OF THE DRAWINGS

The foregoing and further objects, features and advantages of the invention will become apparent from the following description of preferred embodiments with reference to the accompanying drawings, wherein:

FIG. 14 is a flowchart of a control routine executed by the ECU in a sixth embodiment of the invention;

DETAILED DESCRIPTION OF PREFERRED EMBODIMENTS

Figure 1:
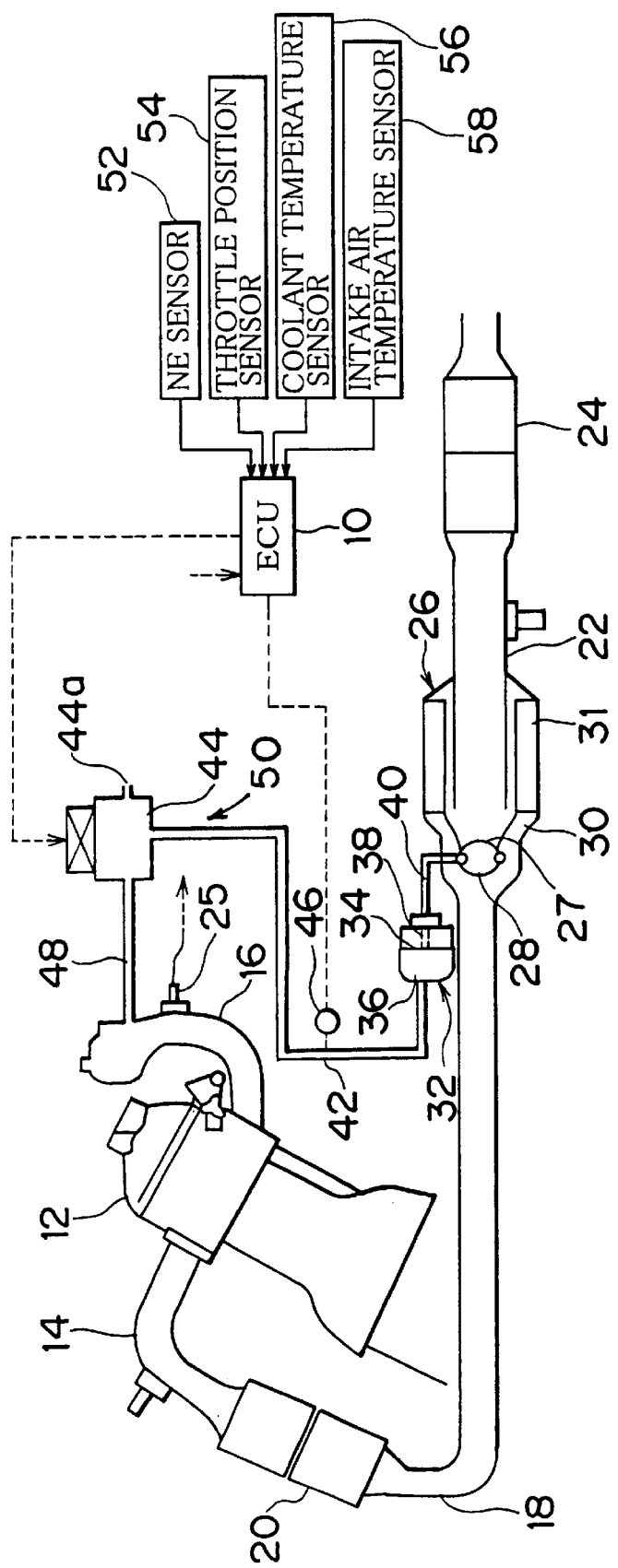
FIG. 1 is a structural view of a system in accordance with an embodiment of the invention.

FIG. 1 is a structural view of a system in accordance with the invention. The system of this embodiment is controlled by an electronic control unit (hereinafter referred to as an ECU) 10. As shown in FIG. 1, the system of this embodiment is equipped with an internal combustion engine 12. The internal combustion engine 12 is equipped with an exhaust manifold 14 and an intake manifold 16. The exhaust manifold 14 is connected to a first exhaust pipe 18. A start catalyst 20 is provided in the neighborhood of an upstream end of the first exhaust pipe 18. A second exhaust pipe 22 is connected to a downstream side of the first exhaust pipe 18. A main catalyst 24 is provided in the second exhaust pipe 22. An intake pressure sensor 25 is disposed in the intake manifold 16. The intake pressure sensor 25 outputs an electric signal corresponding to an internal pressure of the intake manifold 16, that is, an intake manifold negative pressure (hereinafter referred to as an intake pressure PM). An output signal from the intake pressure sensor 25 is supplied to the ECU 10. The ECU 10 detects the intake pressure PM based on the output signal from the intake pressure sensor 25. It is also possible to estimate an intake pressure PM based on a load (e.g. an amount of intake air) of the internal combustion engine 12 without providing the intake manifold 16 with the intake pressure sensor 25.

An HC adsorption equipment 26 is provided at a joint between the first exhaust pipe 18 and the second exhaust pipe 22. The HC adsorption equipment 26 is equipped with a main passage 27, a switching valve 28 and a bypass passage 30. The main passage 27 establishes communication between the first exhaust pipe 18 and the second exhaust pipe 22 at their respective central portions with a large opening area. The switching valve 28 opens and closes the main passage 27. The bypass passage 30 bypasses the periphery of the main passage 27 and establishes communication between the first exhaust pipe 18 and the second exhaust pipe 22. An HC adsorbent 31 is disposed in the bypass passage 30. The HC adsorbent 31 has a characteristic of adsorbing hydrocarbon (HC) contained in exhaust gas.

The system of this embodiment is equipped with a diaphragm mechanism 32. A diaphragm 34 is provided inside the diaphragm mechanism 32. The diaphragm 34 divides the internal space of the diaphragm mechanism 32 into a variable pressure chamber 36 on the left and an atmospheric pressure chamber 38 on the right as shown in FIG. 1. The switching valve 28 is coupled to the diaphragm 34 through an actuating rod 40. When the diaphragm 34 is not deflected, the switching valve 28 assumes its full-opening state and makes the main passage 27 passable. When the diaphragm 34 is deflected towards the variable pressure chamber 36 to its maximum, the switching valve 28 assumes its full-closure state and shuts the main passage 27 off.

The pressure in the atmospheric pressure chamber 38 is always maintained at an atmospheric pressure. A negative pressure feed line 42 is connected at one end to the variable pressure chamber 36 and at the other end to a vacuum switching valve (hereinafter referred to as a VSV) 44. A pressure sensor 46 communicates with the negative pressure feed line 42 and outputs a signal corresponding to a pressure therein, that is, a pressure supplied to the variable pressure chamber 36 (hereinafter referred to as a feed pressure P). The output signal from the pressure sensor 46 is supplied to the ECU 10. The ECU 10 detects the feed pressure P based on the output signal from the pressure sensor 46. It is also possible to provide the variable pressure chamber 36 with the pressure sensor 46.

A negative pressure passage 48 communicating with the intake manifold 16 is connected to the VSV 44. The VSV 44 is equipped with an atmospheric opening 44a which is open to the atmosphere. When the VSV 44 is off, it establishes communication between the negative pressure feed line 42 and the atmospheric opening 44a. Upon receipt of an ON-signal from the ECU 10, the VSV 44 is turned on and shuts the negative pressure feed line 42 off from the atmospheric opening 44a so that the negative pressure feed line 42 is connected to the negative pressure passage 48.

An NE sensor 52 and a throttle position sensor 54 are connected to the ECU 10. The NE sensor 52 outputs a signal corresponding to a rotational speed of the internal combustion engine 12 (hereinafter referred to as an engine speed NE). The throttle position sensor 54 outputs a signal corresponding to an opening degree of a throttle valve for controlling an amount of intake air (hereinafter referred to as a throttle opening degree TA). The ECU 10 detects the engine speed NE based on the output signal from the NE sensor 52 and the throttle opening degree TA based on the output signal from the throttle position sensor 54.

A coolant temperature sensor 56 and an intake air temperature sensor 58 are connected to the ECU 10. The coolant temperature sensor 56 outputs a signal corresponding to a temperature of the coolant flowing inside a water jacket of the internal combustion engine 12 (hereinafter referred to as a coolant temperature THW). The intake air temperature sensor 58 outputs a signal corresponding to a temperature of the air flowing inside the intake manifold 16 (hereinafter referred to as an intake air temperature THA). The ECU 10 detects the coolant temperature THW based on the output signal from the coolant temperature sensor 56 and the intake air temperature THA based on the output signal from the intake air temperature sensor 58. Based on these temperatures, the ECU 10 estimates a temperature of the exhaust gas discharged from the internal combustion engine 12 and a temperature of a later-described switching mechanism 50.

According to the aforementioned construction, when the VSV 44 is off, an atmospheric pressure is introduced into the variable pressure chamber 36 of the diaphragm mechanism 32 through the negative pressure feed line 42. In this case, since the variable pressure chamber 36 and the atmospheric pressure chamber 38 are equal in pressure, the diaphragm 34 is not deflected.

As described above, when the diaphragm 34 is not deflected, the switching valve 28 assumes its full-opening state. Thus, when the VSV 44 is kept off, the switching valve 28 assumes its full-opening state, whereby most exhaust gas flows from the first exhaust pipe 18 into the second exhaust pipe 22 through the main passage 27 without passing through the bypass passage 30, that is, without passing through the HC adsorbent 31.

On the other hand, when the VSV 44 is on, an intake pressure PM is supplied to the variable pressure chamber 36 of the diaphragm mechanism 32 through the negative pressure feed line 42. In this case, the variable pressure chamber 36 becomes lower in pressure than the atmospheric pressure chamber 38, whereby the diaphragm 34 is deflected towards the variable pressure chamber 36. As described above, when the diaphragm 34 is deflected towards the variable pressure chamber 36 to its maximum, the switching valve 28 assumes its full-opening state. Thus, when the VSV 44 is turned on, the switching valve 28 assumes its full-closure state, whereby the exhaust gas discharged into the first exhaust pipe 18 flows from the first exhaust pipe 18 into the second exhaust pipe 22 through the bypass passage 30, that is, through the HC adsorbent 31.

In this manner, the switching valve 28, the actuating rod 40, the diaphragm mechanism 32, the negative pressure feed line 42 and the VSV 44 constitute a mechanism which, with the aid of the intake pressure PM, switches a path of exhaust gas in the HC adsorption equipment 26 between the main passage 27 and the bypass passage 30. The switching valve 28, the actuating rod 40, the diaphragm mechanism 32, the negative pressure feed line 42 and the VSV 44 will hereinafter be referred to generically as the switching mechanism 50.

In the system of this embodiment, when the internal combustion engine 12 is cold, the ECU 10 supplies an ON-signal to the VSV 44. In this case, as described above, exhaust gas passes through the HC adsorbent 31 and is thereby removed of the HC contained therein. Thus, during the cold operation wherein the start catalyst 20 and the catalytic converter 24 do not purify exhaust gas, the exhaust gas containing HC is prevented from being discharged to the outside.

While the internal combustion engine 12 is in operation, the switching valve 28 is always exposed to exhaust gas. Hence, the unburnt gas, carbon and the like contained in exhaust gas adhere to the switching valve 28 and may thereby cause an abnormality in the switching valve 28 (hereinafter referred to as a stroke abnormality in the switching valve 28). That is, the switching valve 28 may be locked or unable to be opened or closed beyond a certain position.

In the case where there is a malfunction in the VSV 44, where the negative pressure feed line 42 cracks or collapses, where the joint disengages, or where the variable pressure chamber 36 undergoes an abnormality such as insufficient sealability (hereinafter referred to as the case where there is a malfunction in a negative pressure transmission system), even if an ON-signal is supplied to the VSV 44, the variable pressure chamber 36 of the diaphragm mechanism 32 is not supplied with a sufficient negative pressure and hence the switching valve 28 cannot be closed. The system of this embodiment is advantageous for its capability to precisely judge the occurrence of the abnormalities as mentioned above in the switching mechanism 50.

Figure 2:
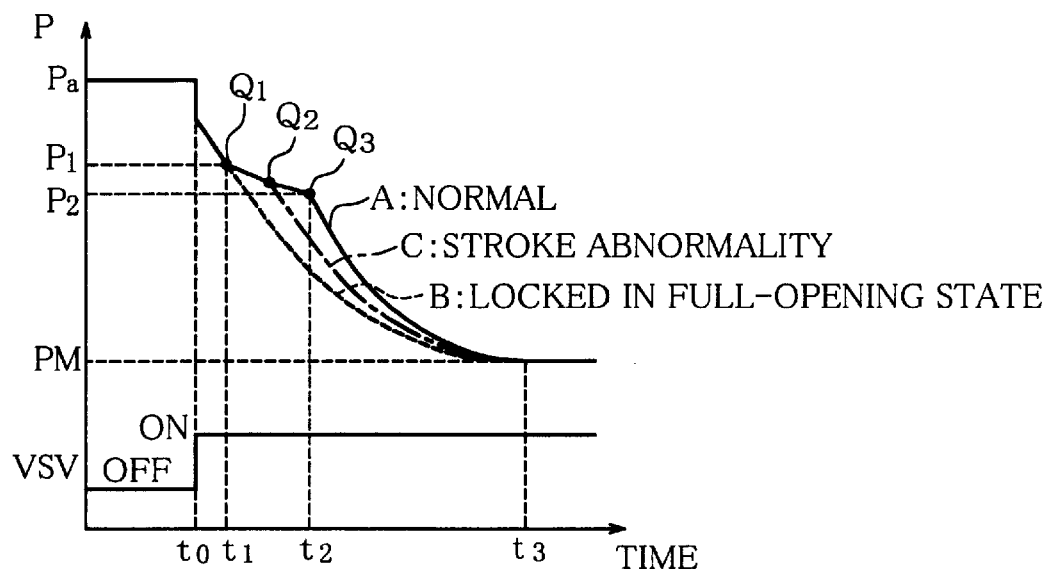
FIG. 2 shows time-dependent changes in feed pressure P when a vacuum switching valve (VSV) is on, in the case A where the switching valve functions normally, in the case B where the switching valve is locked in its full-opening state, and in the case C where the switching valve has an abnormal stroke and cannot further be closed from its half-opening state.

FIG. 2 shows an example of time-dependent changes in feed pressure P when the VSV 44 is switched from off to on, in the case A where the switching valve 28 functions normally, in the case B where the switching valve 28 is locked in its full-opening state, and in the case C where the switching valve 28 has an abnormal stroke and can only be closed from its full-opening state to its half-opening state. The cases A, B and C are indicated by a solid line, a broken line and an alternate long and short dash line respectively. FIG. 2 also shows whether the VSV 44 is on or off at each moment.

It will first be described how the feed pressure P changes in the case where the switching valve 28 functions normally. In the case where the switching valve 28 functions normally as indicated by a solid line A in FIG. 2, the VSV 44 is kept off prior to a moment t0 and thus the feed pressure P is maintained at an atmospheric pressure Pa. If the VSV 44 is turned on at the moment t0, the negative pressure feed line 42 is supplied with an intake pressure PM and thus the feed pressure P starts to decrease. If the feed pressure P reaches a predetermined pressure P1 at a moment t1, the diaphragm 34 starts to be deflected towards the variable pressure chamber 36. If the diaphragm 34 is deflected towards the variable pressure chamber 36, the variable pressure chamber 36 decreases in volume accordingly. In this case, since the volume of a space to be aspirated by means of the intake pressure PM (i.e. an internal space formed by the negative pressure feed line 42 and the variable pressure chamber 36; hereinafter referred to as an aspiration space) decreases, the descending gradient of the feed pressure P decreases discontinuously in comparison with the moment when the diaphragm 34 starts to be deflected. A point where the descending gradient of the feed pressure P decreases discontinuously upon deflection of the diaphragm 34 will hereinafter be referred to as a first change point Q1 of the feed pressure P.

If the feed pressure P passes through the first change point Q1 and decreases to a predetermined pressure P2 at a moment t2, the diaphragm 34 is deflected to its maximum possible extent and the variable pressure chamber 36 does not change in volume afterwards. Hence, the descending gradient of the feed pressure P increases discontinuously at the moment t2. A point where the descending gradient of the feed pressure P increases discontinuously due to the maximum deflection of the diaphragm 34 will hereinafter be referred to as a second change point Q2 of the feed pressure P. If the feed pressure P reaches the intake pressure PM at a moment t3, the feed pressure P is kept substantially equal to the intake pressure PM.

On the other hand, in the case where the switching valve 28 is locked in its full-opening state, even if the feed pressure P becomes equal to or lower than the predetermined pressure P1, the diaphragm 34 is not deflected and thus the variable pressure chamber 36 does not decrease in volume. Thus, unlike the case where the switching valve 28 functions normally, neither the first change point Q1 nor the second change point Q2 appears on the curve of the feed pressure P as indicated by the broken line B in FIG. 2.

In this manner, based on whether or not the first change point Q1 or the second change point Q2 appears on the curve of the feed pressure P after the VSV 44 has been turned on (in other words, based on whether or not the descending gradient of the feed pressure P becomes equal to or smaller than a predetermined value within a predetermined period after the VSV 44 has been turned on), it is possible to determine whether or not the switching valve 28 is locked in its full-opening state.

In the case where the switching valve 28 has an abnormal stroke and can only be closed from its full-opening state to its half-opening state, the maximum deflection amount of the diaphragm 34 decreases in comparison with the case where the switching valve 28 functions normally. Thus, as indicated by an alternate long and two short dashes line C in FIG. 2, the second change point Q2 appears on the curve of the feed pressure P earlier in comparison with the case where the switching valve 28 functions normally. The timing at which the second change point Q2 is generated becomes earlier as the maximum deflection amount of the diaphragm 34 decreases. Therefore, the maximum deflection amount of the diaphragm 34, namely, the on-off stroke of the switching valve 28 can be determined based on the timing at which the second change point Q2 is generated.

Figure 3:
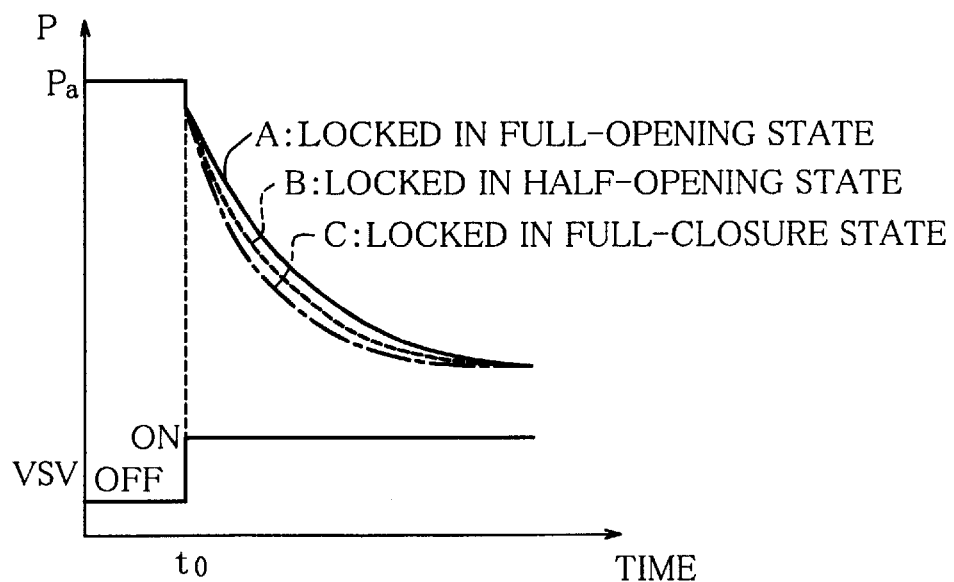
FIG. 3 shows time-dependent changes in feed pressure P when the VSV is on, in the case A where the switching valve is locked in its full-opening state, in the case B where the switching valve is locked in its half-opening state, and in the case C where the switching valve is locked in its full-closure state.

FIG. 3 shows an example of time-dependent changes in feed pressure P when the VSV 44 is switched from off to on, in the case A where the switching valve 28 is locked in its full-opening state, in the case B where the switching valve 28 is locked in its half-opening state, and in the case C where the switching valve 28 is locked in its full-closure state. The cases A, B and C are indicated by a solid line, a broken line and an alternate long and short dash line respectively. As is the case with FIG. 2, FIG. 3 also shows whether the VSV 44 is on or off at each moment.

In the case where the switching valve 28 is locked, as the locking position of the switching valve 28 becomes closer to the full-closure position, the diaphragm mechanism 32 is maintained in a state where the diaphragm 34 has been deflected more greatly, that is, in a state where the variable pressure chamber 36 has more drastically decreased in volume. In the case where the VSV 44 is turned on, as the variable pressure chamber 36 becomes smaller in volume, the aspiration space becomes smaller in volume. Therefore, the feed pressure P decreases rapidly. As indicated by A through C in FIG. 3, as the locking position of the switching valve 28 becomes closer to the full-closure position, the feed pressure P decreases more rapidly after the turning-on of the VSV 44.

Thus, based on one of the descending gradient of the feed pressure P immediately after the turning-on of the VSV 44, the value of the feed pressure P after the lapse of a predetermined length of time since the turning-on of the VSV 44, and the time required for the feed pressure P to reach a predetermined pressure, it is possible to determine a locking position of the switching valve 28.

In this manner, the system shown in FIG. 1 makes it possible to determine, based on the tendency of changes in feed pressure P after the turning-on of the VSV 44, whether or not the switching valve 28 is locked, whether or not the switching valve 28 has a stroke abnormality, and where the locking position is if the switching valve 28 is locked.

In the case where there arises a malfunction in the negative pressure transmission system, even if the VSV 44 is turned on, the feed pressure P does not reach the intake pressure PM. Thus, if the feed pressure P does not become equal to or lower than a predetermined value even after the lapse of a sufficient length of time since the turning-on of the VSV 44, it can be determined that there has arisen a malfunction in the negative pressure transmission system. In particular, in the case where there is a malfunction in the VSV 44, even if an ON-signal is supplied to the VSV 44, the intake pressure PM is not introduced into the negative pressure feed line 42. Thus, in the case where the feed pressure P does not change even if an ON-signal has been supplied to the VSV 44, it can be determined that there is a malfunction in the VSV 44.

If the intake pressure PM changes greatly while the occurrence of an abnormality in the switching mechanism 50 is judged based on changes in feed pressure P, the feed pressure P may change accordingly and cause a deterioration in the precision of judging the occurrence of an abnormality in the switching valve 28. In order to avoid such an inconvenience, the negative pressure passage 48 is provided with, for example, a regulator valve so that the negative pressure supplied to the negative pressure feed line 42 is kept constant.

As the negative pressure feed pipe 42 and the variable pressure chamber 36 increase in volume, the decreasing rate of the volume of the aspiration space at the time of deflection of the diaphragm 34 decreases. Hence, the change in gradient of the feed pressure P at the first change point Q1 also decreases. For this reason, in the switching mechanism 50, the volumes of the negative pressure feed line 42 and the negative pressure chamber 36 are made small enough to elucidate a change in gradient at the first change point Q1.

As the maximum deflection amount of the diaphragm 34 decreases, the period of time between generation of the first change point Q1 to generation of the second change point Q2 shortens. Hence, it becomes difficult to determine a moment of generation of the second change point Q2 with high precision. For this reason, in the switching mechanism 50, the maximum deflection amount of the diaphragm 34 is made large enough to allow a moment of generation of the second change point Q2 to be determined with high precision.

As the deflection rigidity of the diaphragm 34 increases, the speed of deflection of the diaphragm 34 decreases. Hence, the decreasing rate of the descending gradient of the feed pressure P in the range from the first change point Q1 to the second change point Q2 decreases. For this reason, in the switching mechanism 50, the deflection rigidity of the diaphragm 34 is made small enough to elucidate the first change point Q1 and the second change point Q2.

In addition, the tendency of change in feed pressure P also depends on a pressure-detecting position of the pressure sensor 46. For this reason, in the switching mechanism 50, the pressure sensor 46 is disposed at such a position as to allow the occurrence of an abnormality in the switching valve 28 to be judged precisely.

Figure 4:
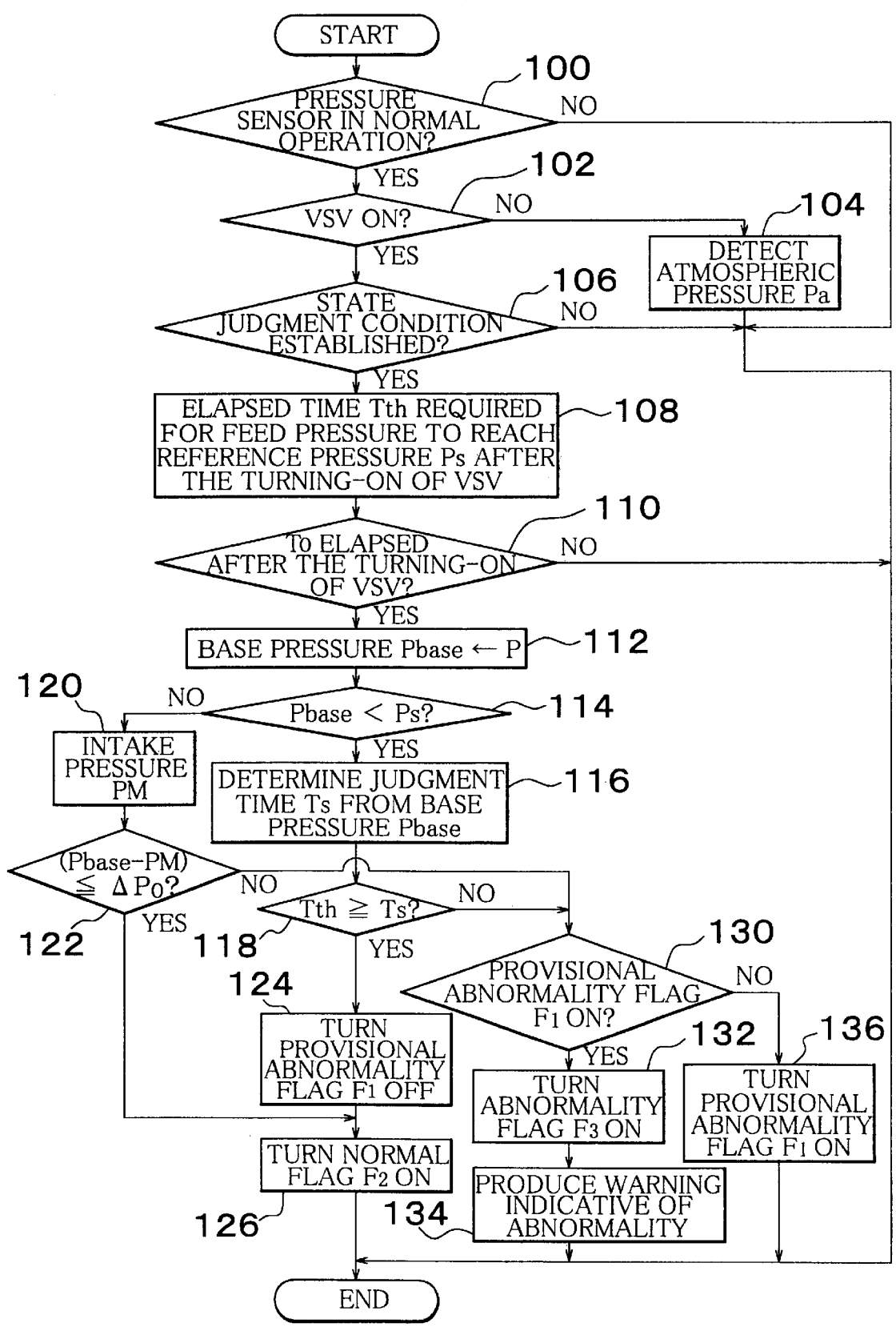
FIG. 4 is a flowchart of a routine executed by an electronic control unit (ECU) to judge the occurrence of an abnormality in a switching mechanism in this embodiment.
Figure 5:
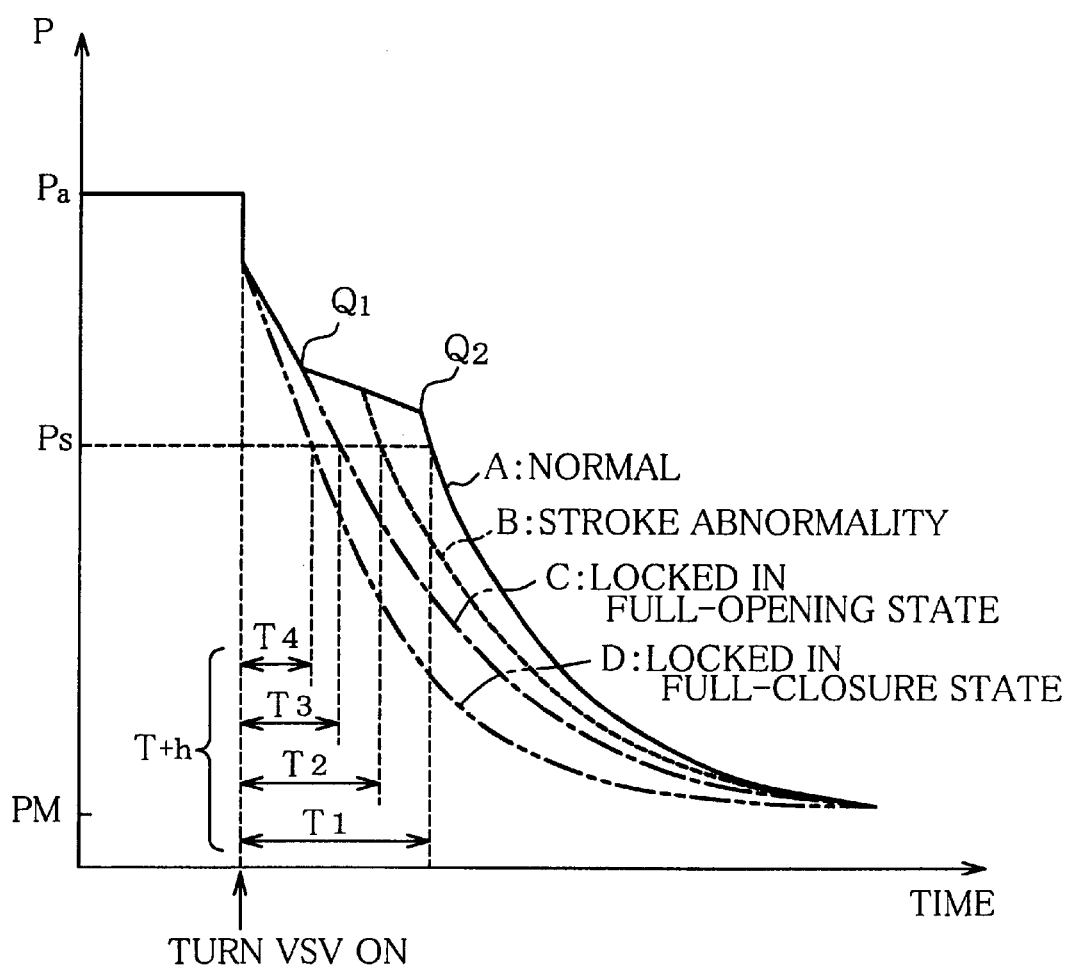
FIG. 5 explains a method of judging the occurrence of an abnormality in the switching mechanism in the routine shown in FIG. 4.

The processings performed by the ECU 10 to judge the occurrence of an abnormality in the switching mechanism 50 in this embodiment will be described hereinafter with reference to FIGS. 4 and 5. FIG. 4 is a flowchart of an exemplary routine executed by the ECU 10 in this embodiment. FIG. 5 explains a method of judging the occurrence of an abnormality in the switching valve 28 in the routine shown in FIG. 4, and shows time-dependent changes in feed pressure P in the case A where the switching valve 28 functions normally, in the case B where the switching valve 28 has an abnormal stroke and can only be closed to its half-opening state, in the case C where the switching valve 28 is locked in its full-opening state, and in the case D where the switching valve 28 is locked in its full-closure state. The cases A, B, C and D are indicated by a solid line, a broken line, an alternate long and short dash line, and an alternate long and two short dashes line respectively.

In the routine shown in FIG. 4, the state of the switching valve 28 is judged based on an elapsed time Tth required for the feed pressure P to reach a predetermined reference pressure Ps after the supply of an ON-signal to the VSV 44. As shown in FIG. 5, the reference pressure Ps is set, for example, to a value smaller than the feed pressure P at the second change point Q2 and sufficiently greater than the intake pressure PM.

As shown in FIG. 5, the elapsed time Tth is equal to T1 in the case A where the switching valve 28 functions normally, equal to T2 in the case B where the switching valve 28 has an abnormal stroke and can only be closed to its half-opening state, equal to T3 in the case C where the switching valve 28 is locked in its full-opening state, and equal to T4 in the case D where the switching valve 28 is locked in its full-closure state. The elapsed time Tth becomes shorter in the sequence of A, B, C and D. That is, the elapsed time Tth reflects changes in the tendency of changes in feed pressure P corresponding to the state of the switching valve 28 as has been described above with reference to FIGS. 2 and 3. Hence, the routine shown in FIG. 4 determines a judgment time Ts in consideration of error factors for the value T1 of the elapsed time Tth in the case where the switching valve 28 functions normally. If the elapsed time Tth that has been measured is shorter than the judgment Ts, it is determined that there arises an abnormality in the switching valve 28.

As described above, if there arises a malfunction in the negative pressure transmission system, for example, in the case where there arises a malfunction in the VSV 44, where the negative pressure feed line 42 cracks, collapses or disengages, or where the variable pressure chamber 36 undergoes an abnormality such as insufficient sealability, the feed pressure P is unable to reach the reference pressure Ps. Hence, in this case, the intake pressure PM detected based on an output signal from the intake pressure sensor 25 is compared with the feed pressure P after the lapse of a sufficient length of time since the turning-on of the VSV 44. If the difference therebetween exceeds a predetermined value, it is determined that there is a malfunction in the negative pressure transmission system.

A concrete description will hereinafter be made as to the contents of the routine shown in FIG. 4. The routine shown in FIG. 4 is repeatedly activated every time its processings are completed. Upon activation of the routine shown in FIG. 4, the processing in STEP 100 is first of all performed.

It is determined in STEP 100 whether or not the pressure sensor 46 is in normal operation. This determination is made, for example, based on the result of initial check in the internal combustion engine 12. If the result confirms that the pressure sensor 46 is not in normal operation, it is determined that the judgment of the occurrence of an abnormality in the switching valve 28 based on the feed pressure P cannot be made, and then the present routine is terminated. On the other hand, if it is determined in STEP 100 that the pressure sensor 46 is in normal operation, the processing in STEP 102 is performed next.

It is determined in STEP 102 whether or not an ON-signal has been supplied to the VSV 44. If the result confirms that an ON-signal has not been supplied to the VSV 44, atmosphere is introduced into the negative pressure feed line 42. In this case, an atmospheric pressure Pa is detected based on an output signal from the pressure sensor 46 in STEP 104, and then the present routine is terminated. In this routine, the atmospheric pressure Pa detected in STEP 104 is used to correct the output signal from the pressure sensor 46, whereby the feed pressure P on the basis of the atmospheric pressure Pa is detected. On the other hand, if an ON-signal has been supplied to the VSV 44 in STEP 102, the processing in STEP 106 is performed next.

It is determined in STEP 106 whether or not the condition for judging the occurrence of an abnormality in the switching mechanism 50 based on changes in feed pressure P (the abnormality judgment condition) is established. To be more precise, for example, in the case where the intake pressure PM has settled to a value equal to or lower than a predetermined pressure and where the outside air temperature is equal to or higher than a predetermined temperature, the abnormality judgment condition is established. If the abnormality judgment condition is not established in STEP 106, the present routine is terminated. On the other hand, if the abnormality judgment condition is established, the processing in STEP 108 is performed next.

In STEP 108, the elapsed time Tth required for the feed pressure P to reach the reference pressure Ps after the start of supply of the ON-signal to the VSV 44 is measured. It is determined in STEP 110 whether or not a predetermined length of time T0 has elapsed after the start of supply of the ON-signal to the VSV 44. The predetermined length of time T0 is preliminarily determined as a length of time required for the feed pressure P to reach the intake pressure PM. If the predetermined length of time T0 has not elapsed in STEP 110, the present routine is terminated. On the other hand, if the predetermined length of time T0 has elapsed in STEP 110, the processing in STEP 112 is performed next.

In STEP 112, the current feed pressure P is stored as a base pressure Pbase. Thus, the base pressure Pbase is equal to the intake pressure PM unless there is a malfunction in the negative pressure transmission system It is determined in STEP 114 whether or not the base pressure Pbase is lower than the reference pressure Ps. If the result confirms that the relation Pbase<Ps is established, the processings for judging a state of the switching valve 28 based on the elapsed time Tth are performed in STEP 116 and STEP 118. On the other hand, if the relation Pbase<Ps is not established in STEP 114, the processings for judging the occurrence of a malfunction in the negative pressure transmission system are performed in STEP 120 and STEP 122.

In STEP 116, the judgment time Ts is determined from the base pressure Pbase. In the case where the switching valve 28 is in normal operation, as the base pressure Pbase becomes lower (i.e. as the intake pressure PM becomes lower), the feed pressure P decreases more rapidly and the elapsed time Tth becomes shorter. Hence, the values of the elapsed time Tth corresponding to various intake pressures PM in the case where the switching valve 28 functions normally are preliminarily stored as a map. In STEP 116, the judgment time Ts is determined from the base pressure Pbase by referring to the map.

It is determined in STEP 118 whether or not the elapsed time Tth is equal to or longer than the judgment time Ts. If the result confirms that the relation Tth≧Ts is established, it is determined that the switching valve 28 is in its normal operation. Next in STEP 124, a provisional abnormality flag F1 is reset to be turned off. After a normal flag F2 has been turned on in STEP 126, the present routine is terminated. Meanwhile, if the relation Tth>Ts is not established in STEP 118, it is provisionally determined that there is an abnormality in the switching valve 28. The processing in STEP 130 is performed next.

It is determined in STEP 130 whether or not the provisional abnormality flag F1 is on. If the result confirms that the provisional abnormality flag F1 is on, the occurrence of an abnormality has successively been judged twice. In this case, it is determined that there is an abnormality in the switching valve 28. Next in STEP 132, an abnormality flag F3 is turned on. In STEP 132, the abnormality flag F3 is turned on. After a warning indicative of the occurrence of an abnormality in the switching mechanism 50 has been issued in STEP 134, the present routine is terminated. On the other hand, if the provisional abnormality flag F1 is not on in STEP 130, the provisional abnormality flag F1 is turned on in STEP 136, and then the present routine is terminated.

In STEP 120, the intake pressure PM is detected based on an output signal from the intake pressure sensor 25.

It is determined in STEP 122 whether or not the difference ΔP between the base pressure Pbase and the intake pressure PM calculated in STEP 120 (=Pbase−PM) is equal to or lower than a predetermined value ΔP0. If the result confirms that the relation ΔP≦ΔP0 is not established, it is provisionally determined that there arises a malfunction in the transmission system. Then, the processings in STEP 130 and the following STEPS are performed, and the present routine is terminated. On the other hand, if the relation ΔP≦ΔP0 is established in STEP 122, it is determined that there is no malfunction in the transmission system. Then, the processing in STEP 126 is performed, and the present routine is terminated.

As described above, in this embodiment, the occurrence of an abnormality in the switching mechanism is judged based on the tendency of changes in feed pressure P after the turning-on of the VSV 44. The tendency of changes in feed pressure P after the turning-on of the VSV 44 almost exclusively depends on the state of the switching mechanism 50. Thus, this embodiment makes it possible to precisely judge the occurrence of an abnormality in the switching mechanism 50.

In the routine shown in FIG. 4, if the elapsed time Tth is equal to or shorter than the reference time Ts, it is determined that there is an abnormality in operation of the switching valve 28. However, as has been described with reference to FIG. 5, the elapsed time Tth is shorter in the case where the switching valve 28 is locked than in the case where the switching valve 28 has a stroke abnormality. Moreover, in the case where the switching valve 28 is abnormally locked, as the locking position becomes closer to the full-closure position, the elapsed time Tth becomes shorter. Hence, the locking of the switching valve 28 and the stroke abnormality may separately be judged based on the elapsed time Tth. In addition, if the switching valve 28 is locked, the locking position of the switching valve 28 may be determined.

Next, a second embodiment of the present invention will be described. In this embodiment, as has been described with reference to FIGS. 2 and 3, the locking of the switching valve 28, the stroke abnormality of the switching valve 28 and the locking position of the switching valve 28 are judged based on the presence or absence of the first change point Q1, the moment of generation of the second change point Q2 and the descending gradient of the feed pressure P at a predetermined moment respectively.

Figure 6:
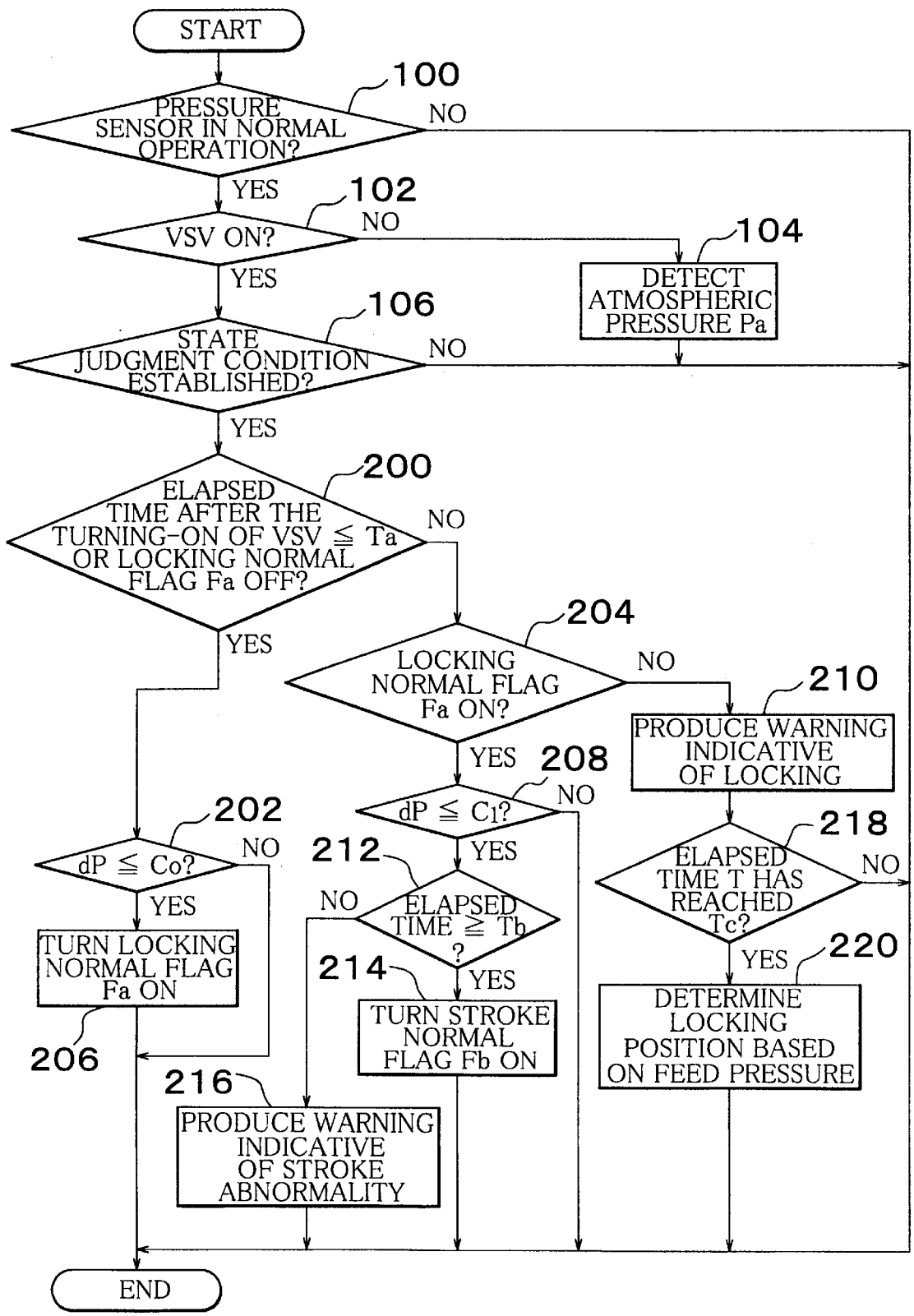
FIG. 6 is a flowchart of a routine executed by the ECU in a second embodiment of the invention.

FIG. 6 is a flowchart of an exemplary routine executed by the ECU 10 in this embodiment. In FIG. 6, the steps for performing processings similar to those of the routine shown in FIG. 4 are denoted by the same reference numerals as in FIG. 4 and will not be described again In the routine shown in FIG. 6, after the processing in STEP 104 has been completed, the processing in STEP 200 is performed next.

In STEP 200, it is determined whether or not the elapsed time T since the supply of an ON-signal to the VSV 44 is equal to or shorter than a predetermined length of time Ta, or it is determined whether or not a locking normal flag Fa is off. The predetermined length of time Ta is made longer than an elapsed time required for generation of the second change point Q2 since the turning-on of the VSV 44 in the case where the switching valve 28 functions normally. Also, as will be described later, the locking normal flag Fa is turned on upon detection of the first change point Q1. If the result in STEP 200 turns out to be affirmative, the processing in STEP 202 is performed next. On the other hand, if the result in STEP 200 turns out to be negative, the processing in STEP 204 is performed next.

It is determined in STEP 202 whether or not the descending gradient dP (=−dP/dt) of the feed pressure P is equal to or smaller than a predetermined value C0. If the result confirms that the relation dP≦C0 is established, it is determined that the descending gradient at the first change point Q1 has decreased. In this case, the locking normal flag Fa is turned on in STEP 206, and then the present routine is terminated. On the other hand, if the relation dP≦C0 is not established in STEP 202, the present routine is terminated without performing the processing in STEP 206.

It is determined in STEP 204 whether or not the locking normal flag Fa is on. If the result confirms that the locking normal flag Fa is on, the processing in STEP 208 is performed next. On the other hand, if the locking normal flag Fa is not on in STEP 204, the processing in STEP 210 is performed next.

It is determined in STEP 208 whether or not the descending gradient dP is equal to or greater than a predetermined value C1. The predetermined value C1 is set to a lower limit value of the descending gradient dP at the moment past the second change point Q2 in the case where the switching valve 28 functions normally. Thus, if the relation dP≧C1 is established in STEP 208, it is determined that the second change point Q2 has been generated. The processing in STEP 212 is then performed. On the other hand, if the result in STEP 208 turns out to be negative, the present routine is terminated.

It is determined in STEP 212 whether or not the elapsed time T after the start of supply of an ON-signal to the VSV 44 is equal to or longer than a predetermined value Tb. The value Tb is set to a lower limit value of the elapsed time required for generation of the second change point Q2 since the turning-on of the VSV 44 in the case where the switching valve 28 functions normally. Thus, if the relation T≧Tb is established in STEP 212, it is determined that there is no stroke abnormality in the switching valve 28. In this case, a stroke normal flag Fb is turned on in STEP 214, and the present routine is terminated. On the other hand, if the relation T≧Tb is not established in STEP 212, it is determined that there occurs a stroke abnormality in the switching valve 28. A warning indicative of the occurrence of the stroke abnormality is issued in STEP 216, and the present routine is terminated.

In STEP 210, a warning indicative of the locking of the switching valve 28 is issued. It is determined in STEP 218 whether or not the elapsed time T after the start of supply of an ON-signal to the VSV 44 has reached a predetermined length of time Tc. The predetermined length of time Tc is preferably set to such a timing that the difference in feed pressure P based on the locking position of the switching valve 28 assumes its maximum value. If the elapsed time T has not reached the predetermined length of time Tc in STEP 218, the present routine is terminated. On the other hand, if the elapsed time T has reached the predetermined length of time Tc in STEP 218, the locking position of the switching valve 28 is judged based on the current feed pressure P in STEP 220, and then the present routine is terminated. In STEP 218 and STEP 220, as has been described with reference to FIG. 3, the locking position of the switching valve 28 may be judged based on the descending gradient of the feed pressure P at a predetermined moment or based on the elapsed time required for the feed pressure P to reach a predetermined pressure.

A third embodiment of the invention will be described with reference to FIGS. 7 and 8.

In the aforementioned first and second embodiments, while the presence or absence of a locking abnormality in the switching valve 28 is judged based on the presence or absence of the first change point Q1, the presence or absence of the first change point Q1 is judged based on whether or not the descending gradient of the feed pressure P has become equal to or smaller than a predetermined value within a predetermined period after the turning-on of the VSV 44.

Figure 7A:
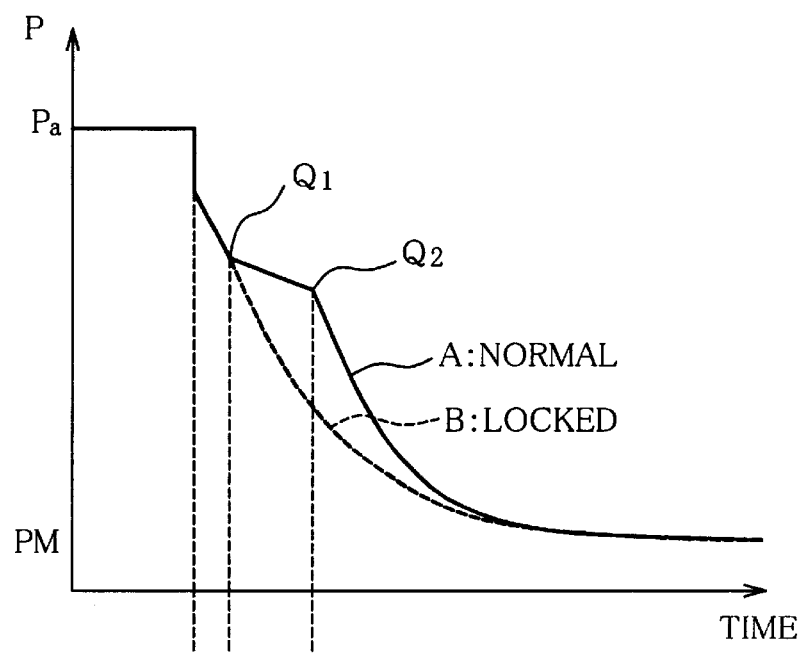
FIGS. 7A and 7B explain a method of judging the occurrence of abnormal locking of the switching valve in a third embodiment of the invention.
Figure 7B:
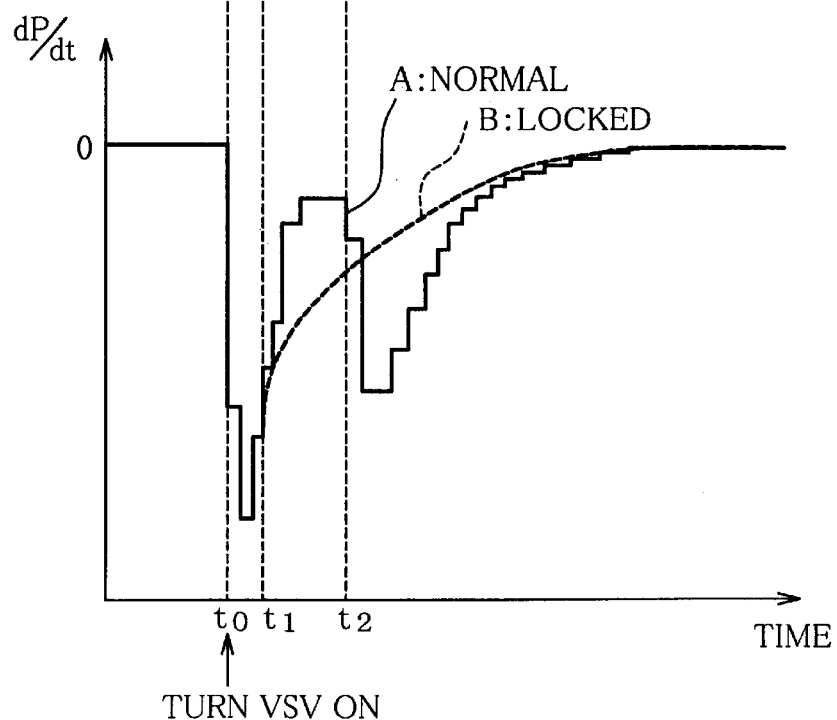

FIGS. 7A and 7B explain a method of judging the occurrence of a locking abnormality in the switching valve 28 in this embodiment. FIG. 7A shows, with a solid line, time-dependent changes in feed pressure P after the tuning-on of the VSV 44 in the case A where the switching valve 28 functions normally. FIG. 7B shows, with a broken line, time-dependent changes in gradient of changes in feed pressure P in the case B where the switching valve 28 is locked.

In the case where the switching valve 28 functions normally, the first change point Q1 and the second change point Q2 appear on the curve of the feed pressure P within a predetermined period after the turning-on of the VSV 44 at a moment t0. That is, the descending gradient of the feed pressure P decreases discontinuously at a moment t1, and then the descending gradient of the feed pressure P increases discontinuously at a moment t2. On the other hand, in the case where the switching valve 28 is locked at all events, neither the first change point Q1 nor the second change point Q2 appears on the curve of the feed pressure P. In other words, the aforementioned state of the descending gradient is not realized.

In this manner, it is possible to determine whether or not the switching valve 28 is locked, based on whether or not the first change point Q1 appears on the curve of the feed pressure P within a predetermined period after the turning-on of the VSV 44, that is, whether or not there is a period when the amount of change in descending gradient of the feed pressure P is greater than a predetermined value. Hence, this embodiment employs the aforementioned method to judge the locking of the switching valve 28.

Figure 8:
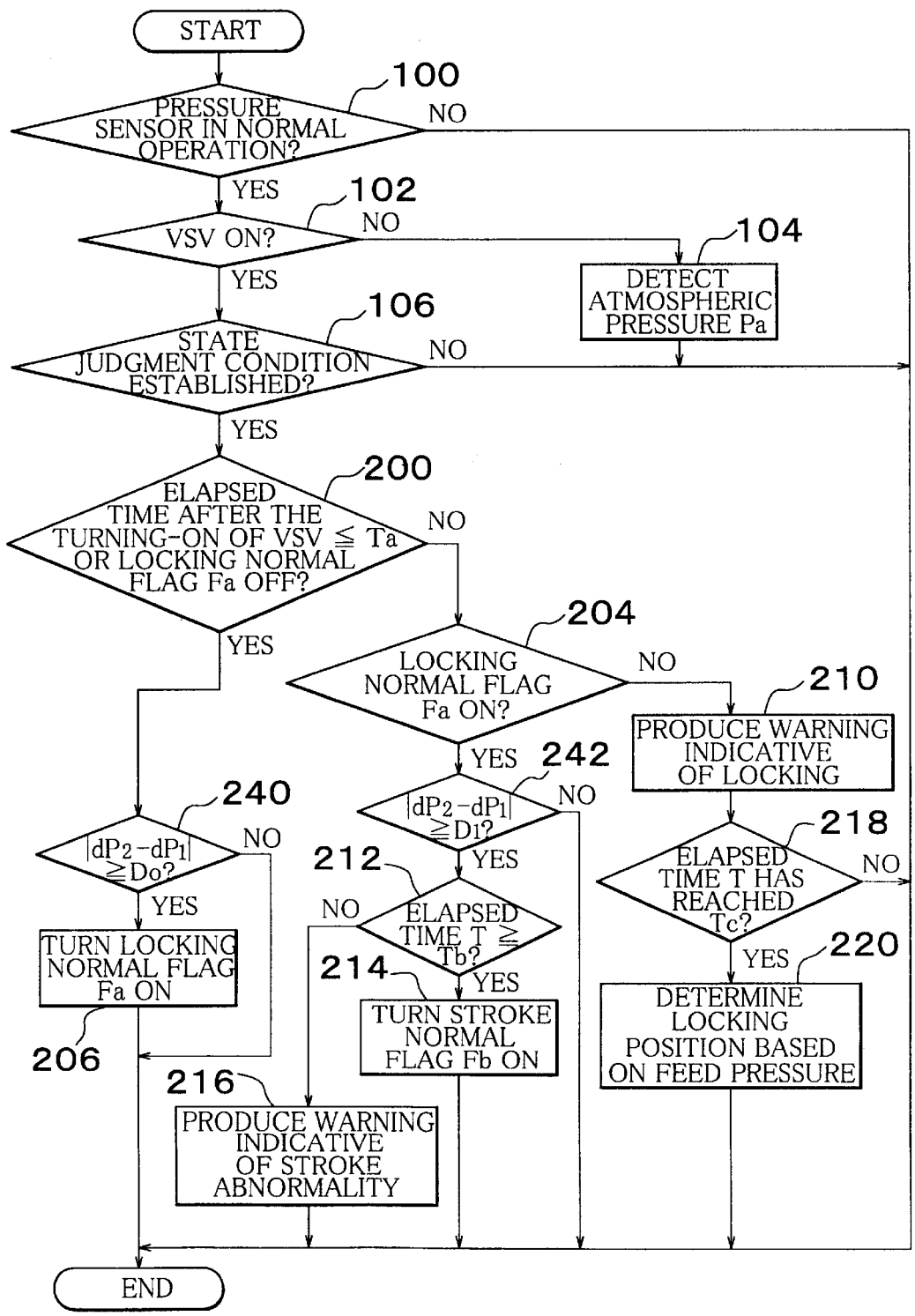
FIG. 8 is a flowchart of a routine executed by the ECU in this embodiment.

FIG. 8 is a flowchart of an exemplary control routine executed by the ECU 10 in this embodiment. In FIG. 8, the steps for performing processings similar to those of the routine shown in FIG. 6 are denoted by the same reference numerals as in FIG. 6 and will not be described again. In the routine shown in FIG. 8, if the result in STEP 200 turns out to be affirmative, the processing in STEP 240 is performed next.

It is determined in STEP 240 whether or not the absolute value of a difference ΔdP (=dP2−dP1) between a descending gradient dP1 of the feed pressure P during the last processing and a descending gradient dP2 of the feed pressure P during the present processing is equal to or greater than a predetermined value D0. The predetermined value D0 is set to a lower limit value which makes it possible to determine that the descending gradient of the feed pressure P decreases discontinuously after the VSV 44 has been turned on under the circumstance where the switching valve 28 functions normally.

If the relation |ΔdP|≧D0 is established, it can be determined that the descending gradient of the feed pressure P has decreased discontinuously, namely, that the tendency of a decrease in feed pressure P has weakened. In this case, it is possible to determine that the first change point Q1 has appeared on the curve of the feed pressure P and that the switching valve 28 is in normal operation. Thus, if it is determined in STEP 240 that the relation $|\Delta dP| \geq D0$ is established, the locking normal flag Fa is turned on in STEP 206 and then the present routine is terminated. On the other hand, if it is determined that the relation $|\Delta dP| \geq D0$ is not established, the present routine is terminated without performing the processing in STEP 206.

If the result in STEP 200 turns out to be negative, the processing in STEP 204 is performed next. If the result in STEP 204 turns out to be affirmative, the processing in STEP 242 is performed next.

It is determined in STEP 242 whether or not the absolute value of a difference $\Delta dP$ (=dP2−dP1) between a descending gradient dP1 of the feed pressure P during the last processing and a descending gradient dP2 of the feed pressure P during the present processing is equal to or greater than a predetermined value D1. The predetermined value D1 is set to a lower limit value which makes it possible to determine that the descending gradient of the feed pressure P increases discontinuously after passage of the second change point Q2 under the circumstance where the switching valve 28 functions normally.

If the relation $|\Delta dP| \geq D1$ is established, it can be determined that the descending gradient of the feed pressure P has increased discontinuously, namely, that the tendency of a decrease in feed pressure P has strengthened. In this case, it can be determined that the second change point Q2 has appeared on the curve of the feed pressure P. Thus, if it is determined in STEP 242 that the relation $|\Delta dP| \geq D1$ is established, the processings in STEP 212 and the following STEPS are performed. On the other hand, if the relation $|\Delta dP| \geq D1$ is not established, the present routine is terminated without performing the processings in STEP 212 and the following STEPS.

The aforementioned processings make it possible to judge the presence or absence of the locking of the switching valve 28 based on whether or not there is a period when the amount of change in the descending gradient of the feed pressure P is greater than a predetermined value within a predetermined period after the turning-on of the VSV 44.

Next, a fourth embodiment of the invention will be described with reference to FIG. 9.

In the first through third embodiments of the present invention, in order to prevent the feed pressure P from changing due to fluctuations of the intake pressure PM when judging the occurrence of an abnormality in the switching mechanism 50, a regulator valve is provided in the negative pressure passage 48 so that the negative pressure supplied to the negative pressure feed line 42 is kept constant.

On the other hand, in this embodiment, the occurrence of an abnormality in the switching mechanism 50 is judged only when the intake pressure PM is kept substantially constant. This method makes it possible to change the feed pressure P depending only on the state of the switching mechanism 50 without providing a regulator valve. Thus, this embodiment makes it possible to precisely judge the occurrence of an abnormality in the switching mechanism 50 based on the tendency of changes in feed pressure P.

Figure 9:
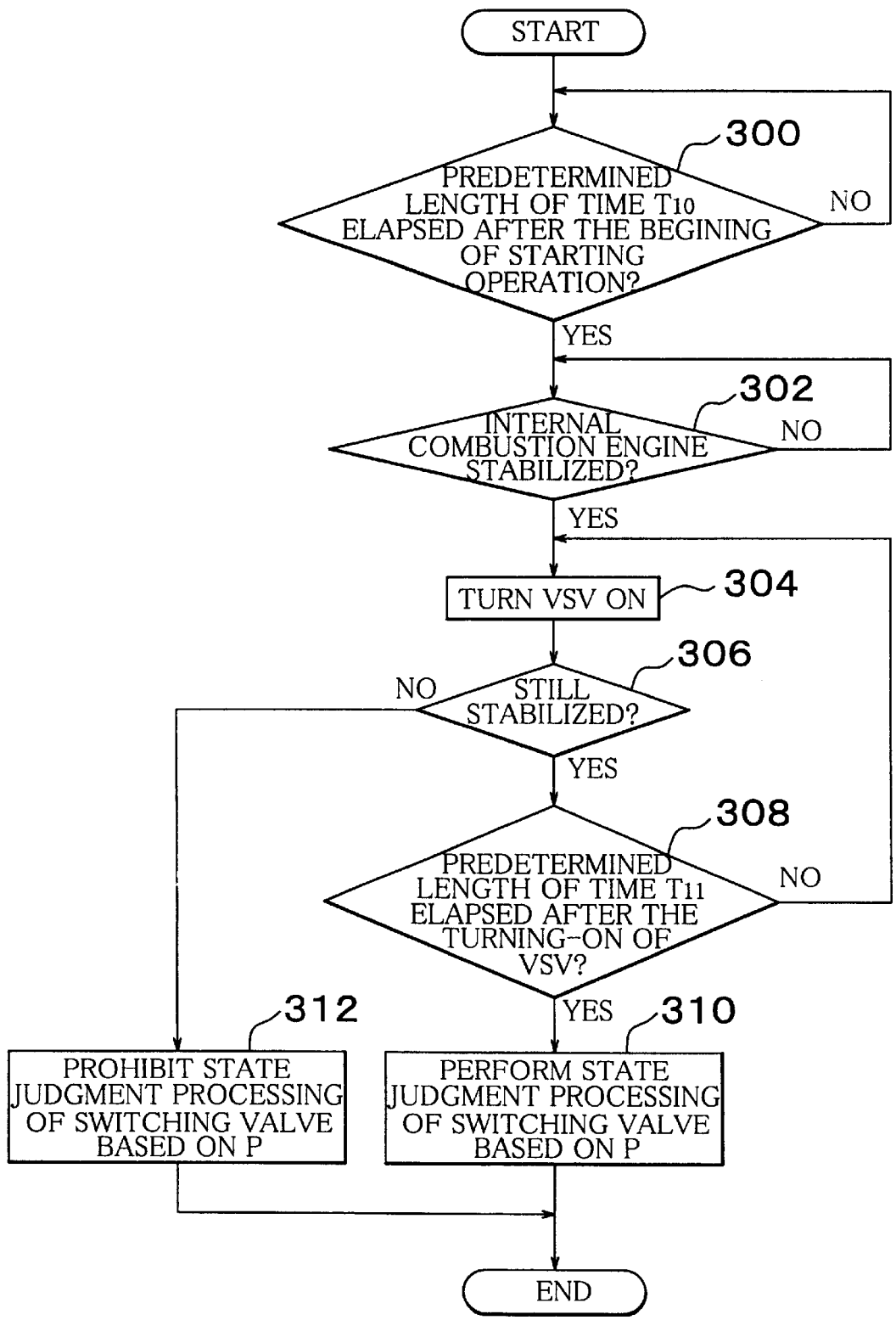
FIG. 9 is a flowchart of a control routine executed by the ECU in a fourth embodiment of the invention.

FIG. 9 is a flowchart of an exemplary routine of a control routine executed by the ECU 10 to realize the aforementioned function in this embodiment. The routine shown in FIG. 9 is repeatedly activated every time its processings are completed. Upon activation of the routine shown in FIG. 9, the processing in STEP 300 is first of all performed.

It is determined in STEP 300 whether or not a predetermined length of time T10 has elapsed since the beginning of the starting operation of the internal combustion engine 12. The predetermined length of time T10 is a preliminarily determined period which is required for the internal combustion engine 12 to operate stably after the beginning of the starting operation of the internal combustion engine 12. The processing in STEP 300 is repeatedly performed until it is determined that the aforementioned condition is established. If the result turns out to be affirmative, the processing in STEP 302 is performed.

It is determined in STEP 302 whether or not the operating state of the internal combustion engine 12 is stabilized. To be more specific, it is determined in STEP 302 whether or not the intake pressure PM detected by means of the intake pressure sensor 25, the engine speed NE detected by means of the NE sensor 52, and the throttle opening degree TA detected by means of the throttle position sensor 54 are maintained within predetermined ranges respectively. The processing in STEP 302 is repeatedly performed until it is determined that the aforementioned condition is established. If those parameters are maintained within the predetermined ranges respectively, it is possible to determine that the operating state of the internal combustion engine 12 is stabilized and that the intake pressure PM is kept substantially constant. Thus, if the result in STEP 302 turns out to be affirmative, the processing in STEP 304 is performed next.

In STEP 304, the processing of supplying an ON-signal to the VSV 44 is performed. If the processing in STEP 304 is performed, the intake pressure PM is thereafter introduced into the negative pressure feed line 42 so that the switching valve 28 is closed.

It is determined in STEP 306 whether or not the operating state of the internal combustion engine 12 is still stabilized. If the result in STEP 306 turns out to be affirmative, the processing in STEP 308 is performed next On the other hand, if the result in STEP 306 turns out to be negative, the processing in STEP 312 is performed next.

It is determined in STEP 308 whether or not a predetermined length of time T11 has elapsed since the start of supply of an ON-signal to the VSV 44. The predetermined length of time T11 is set to a period which is longer than an estimated period required for generation of the first change point Q1 after the turning-on of the VSV 44 in the case where the switching valve 28 functions normally. If the result in STEP 308 turns out to be negative, the processing in STEP 306 is performed again. On the other hand, if the result in STEP 308 turns out to be affirmative, the processing in STEP 310 is performed next.

In STEP 310, the processing of judging the presence or absence of an abnormal state in the switching mechanism 50 based on the tendency of changes in feed pressure P is performed. To be more specific, the processings shown in the first through third embodiments are performed. Upon completion of the processing in STEP 310, the present routine is terminated.

In STEP 312, the processing of prohibiting the judgment of the presence or absence of an abnormal state in the switching mechanism 50 based on the feed pressure P is performed. Upon completion of the processing in STEP 312, the present routine is terminated.

The aforementioned processing makes it possible to prohibit the judgment of an abnormality in the switching mechanism 50 based on the feed pressure P under the circumstance where the operating state of the internal combustion engine 12 is not stabilized. Thus, this embodiment makes it possible to change the feed pressure P in the negative pressure feed line 42 and the variable pressure chamber 36 depending only on the state of the switching mechanism 50. Therefore, this embodiment makes it possible to precisely judge the occurrence of an abnormality in the switching mechanism 50 based on the tendency of changes in feed pressure P and to enhance the precision in judging the occurrence of the abnormality.

In the fourth embodiment, it is determined whether or not the operating state of the internal combustion engine 12 is stabilized, using the intake pressure PM, engine speed NE and throttle opening degree TA of the internal combustion engine 12. In addition, however, the stability of the operating state of the internal combustion engine 12 may be judged based on the result of a determination whether or not the amount of change in fuel injection quantity in the internal combustion engine 12 and the amount of change in vehicle speed are maintained within predetermined ranges respectively. In the case where the internal combustion engine 12 is fitted with intake and exhaust valves with variable opening and closing timings, the stability of the operating state of the internal combustion engine 12 may be judged based on the result of a determination whether or not the opening and closing timings are maintained within predetermined ranges respectively. The intake pressure PM tends to be destabilized immediately after the start of the internal combustion engine 12. Thus, the stability of the operating state of the internal combustion engine 12 may be judged in consideration of the result of a determination whether or not the engine speed NE has exceeded a predetermined value, that is, whether or not the internal combustion engine 12 has at least reached its idle state.

A fifth embodiment of the invention will be described with reference to FIGS. 10 through 12.

In the case where there arises a stroke abnormality in the switching valve 28, the deflection amount of the diaphragm 34 from the start of its deflection to the end of its deflection (hereinafter referred to as a movable amount L) is smaller in comparison with the case where the switching valve 28 functions normally. That is, the timing at which the second change point Q2 is generated after the emergence of the first change point Q1 on the curve of the feed pressure P becomes earlier as the movable amount L of the diaphragm 34 becomes smaller. Thus, it is possible to judge the movable amount L of the diaphragm 34 based on a time interval between a moment of generation of the first change point Q1 on the curve of the feed pressure P and a moment of generation of the second change point Q2 on the curve of the feed pressure P (hereinafter referred to as a change-point-interval time TIME). Thus, it is possible to judge the occurrence of a stroke abnormality in the switching valve 28 based on whether or not the movable amount L of the diaphragm 34 is small.

In the aforementioned switching mechanism 50, the switching valve 28, which is coupled to the diaphragm 34 through the actuating rod 40, is opened or closed in accordance with a state of deflection of the diaphragm 34. In this construction, there may be caused an abnormality of disengagement in a joint between the diaphragm 34 and the switching valve 28 (hereinafter referred to as an unlinking abnormality). In this circumstance, even if an ON-signal has been supplied to the VSV 44, deflection of the diaphragm 34 is not transmitted to the switching valve 28 so that the switching valve 28 cannot be closed.

In general, the diaphragm 34 is designed to be deflectable beyond a deflection amount at which the switching valve 28 assumes its full-opening state. However, the movable amount L of the diaphragm 34 is normally confined to a predetermined range. If there arises an unlinking abnormality in the switching mechanism 50, the movable amount L of the diaphragm 34 is greater in comparison with the case where the switching mechanism 50 functions normally. That is, in this case, the timing at which the second change point Q2 is generated after the emergence of the first change point Q1 on the curve of the feed pressure P becomes later as the movable amount L of the diaphragm 34 becomes greater. Thus, the occurrence of an unlinking abnormality in the switching mechanism 50 can be judged based on whether or not the movable amount L of the diaphragm 34 is great, or based on an elapsed time from generation of the first change point Q1 on the curve of the feed pressure P to emergence of the second change point Q2.

In this manner, the system of this embodiment makes it possible to judge the occurrence of a stroke abnormality in the switching valve 28 and the occurrence of an unlinking abnormality in the switching mechanism 50.

In the case where the negative pressure supplied to the negative pressure feed pipe 42 is kept constant by a regulator valve or the like, the feed pressure P changes depending only on a state of the switching mechanism 50. In this case, the movable amount L of the diaphragm 34 can be determined based only on a change-point-interval time TIME. However, in the case where the negative pressure supplied to the negative pressure feed line 42 is not kept constant, that is, in the case where the negative pressure fluctuates in accordance with an intake pressure PM, even if the switching mechanism 50 is in normal operation, the change-point-interval time TIME may fluctuate.

Figure 10:
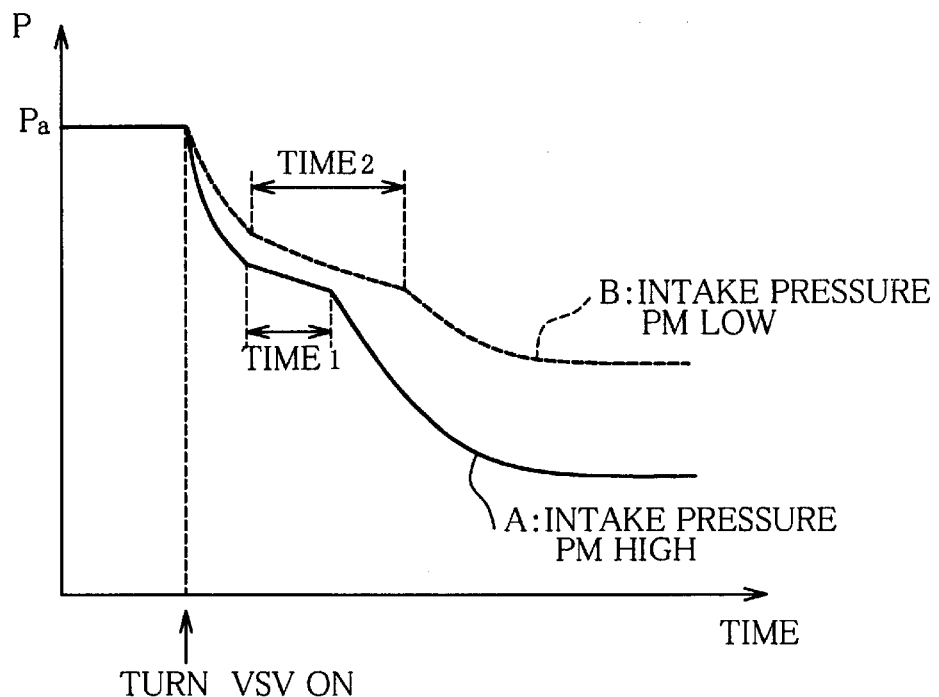
FIG. 10 shows time-dependent changes in feed pressure P when the VSV is turned on, in the case A where the intake manifold negative pressure (intake pressure PM) assumes a great value on the negative pressure side and in the case B where the intake pressure PM assumes a small value on the negative pressure side.

FIG. 10 shows an example of time-dependent changes in feed pressure P when the VSV is switched from off to on, in the case A where the intake pressure PM assumes a great value on the negative pressure side and in the case B where the intake pressure PM assumes a small value on the negative pressure side. The cases A and B are indicated by a solid line and a broken line respectively.

As shown in FIG. 10, as the intake pressure PM becomes greater on the negative pressure side, the feed pressure P decreases more smoothly. That is, the decreasing speed of the feed pressure P fluctuates in accordance with the intake pressure PM. The time from the start of deflection of the diaphragm 34 to the maximum possible deflection of the diaphragm 34, namely, the change-point-interval time TIME becomes shorter as the intake pressure PM becomes greater on the negative pressure side (=TIME 1), and becomes longer as the intake pressure PM becomes smaller on the negative pressure side (=TIME 2>TIME 1). Thus, in the case where the negative pressure supplied to the negative pressure feed line 42 may fluctuate in accordance with the intake pressure PM, it is possible to precisely determine a movable amount L of the diaphragm 34 based on a change-point-interval time TIME and an intake pressure PM.

Figure 11:
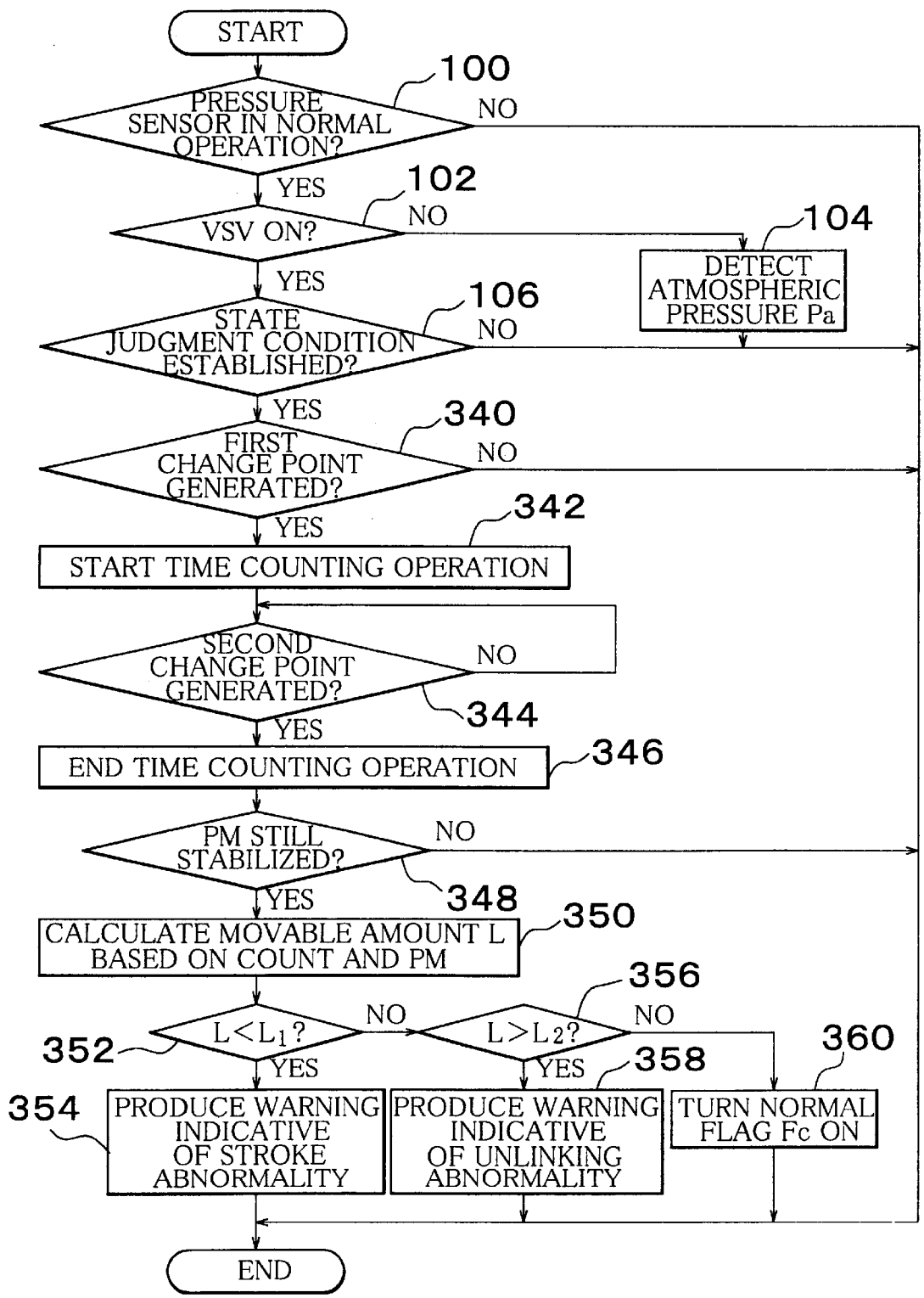
FIG. 11 is a flowchart of a control routine executed by the ECU in a fifth embodiment of the invention.

FIG. 11 is a flowchart of an exemplary control routine executed by the ECU 10 to judge the occurrence of a stroke abnormality in the switching valve 28 and an unlinking abnormality in the switching mechanism 50. The routine shown in FIG. 11 is repeatedly activated every time its processings are completed. In FIG. 11, the steps for performing processings similar to those of the routine shown in FIG. 4 are denoted by the same reference numerals as in FIG. 4 and will not be described again. If the result in STEP 106 turns out to be affirmative, the processing in STEP 340 is performed next.

It is determined in STEP 340 whether or not the first change point Q1 has appeared on the curve of the feed pressure P. To be more specific, it is determined in STEP 340 whether or not the descending gradient of the feed pressure P decreases discontinuously, that is, whether or not the absolute value of an amount ΔdP of change in the descending gradient is equal to or greater than a predetermined value. If the result confirms that the first change point Q1 has not been generated, the present routine is terminated. On the other hand, if it is determined that the first change point Q1 has been generated, the processing in STEP 342 is performed next.

In STEP 342, the processing of counting up from "0" using a counter COUNT for counting the change-point-interval TIME is performed.

It is determined in STEP 344 whether or not the second change point Q2 has appeared on the curve of the feed pressure P. To be more specific, it is determined in STEP 344 whether or not the descending gradient of the feed pressure P increases discontinuously, that is, whether or not the absolute value of an amount ΔdP of change in the descending gradient is equal to or greater than a predetermined value. The processing in STEP 344 is repeatedly performed until it is determined that the second change point Q2 has been generated. If the result confirms that the second change point Q2 has been generated, the processing in STEP 346 is performed next In STEP 346, the processing of terminating the counting operation of the counter COUNT is performed. If the processing in STEP 346 is performed, the change-point-interval time TIME is calculated.

It is determined in STEP 348 whether or not the intake pressure PM has continuously been settled to a value equal to or lower than a predetermined pressure from generation of the first change point Q1 to the present moment. If the result in STEP 348 turns out to be negative, the intake pressure PM fluctuates. Therefore, the movable amount L of the diaphragm 34 cannot precisely be detected. Thus, in the case of such a negative determination, the present routine is terminated. On the other hand, if the result turns out to be affirmative, the processing in STEP 350 is performed next.

In STEP 350, the movable amount L of the diaphragm 34 is calculated based on the change-point-interval time TIME and the intake pressure PM.

Figure 12:
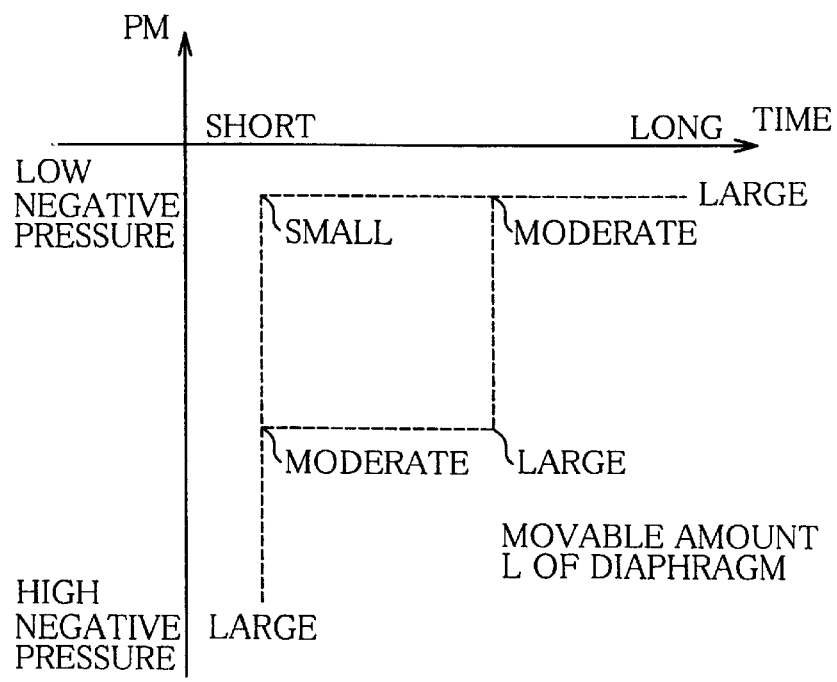
FIG. 12 shows a two-dimensional map of change-point-interval time TIME and intake pressure PM, which is designed to calculate a movable amount of a diaphragm.

FIG. 12 shows a two-dimensional map of change-point-interval time TIME and intake pressure PM, which is designed to calculate a movable amount L of the diaphragm 34. In STEP 350, the movable amount L of the diaphragm 34 is calculated by referring to the map shown in FIG. 12.

It is determined in STEP 352 whether or not the movable amount L of the diaphragm 34 calculated in STEP 350 is smaller than a predetermined value L1. The predetermined value L1 is a lower limit value of the movable amount L of the diaphragm 34 which makes it possible to determine that the switching valve 28 functions normally. If the result confirms that the relation L<L1 is established, a warning indicative of the occurrence of a stroke abnormality in the switching valve 28 is issued in STEP 354, and then the present routine is terminated. On the other hand, if it is determined in STEP 352 that the relation L<L1 is not established, the processing in STEP 356 is performed next.

It is determined in STEP 356 whether or not the movable amount L of the diaphragm 34 has exceeded a predetermined value L2. The predetermined value L2 is an upper limit value of the movable amount L of the diaphragm 34 which makes it possible to determine that the switching valve 28 functions normally. If the result confirms that the relation L>L2 is established, a warning indicative of the occurrence of an unlinking abnormality in the switching mechanism 50 is issued, and then the present routine is terminated.

If it is determined that the relation L>L2 is not established, it is possible to determine that the movable amount of the diaphragm 34 is maintained within a predetermined range. Thus, in the case of such a determination, the processing in STEP 360 is performed next.

In STEP 360, the processing of turning on a normal flag Fc indicative of a normality in the switching mechanism 50 is performed. Upon completion of the processing in STEP 360, the present routine is terminated.

The aforementioned processing makes it possible to precisely determine a movable amount of the diaphragm 34 based on the change-point-interval TIME and the intake pressure PM, even in the case where the negative pressure supplied to the negative pressure feed line 42 may fluctuate in accordance with the intake pressure PM. Hence, this embodiment makes it possible to judge the occurrence of a stroke abnormality in the switching valve 28 and the occurrence of an unlinking abnormality in the switching mechanism 50.

In the fifth embodiment, the occurrence of an unlinking abnormality in the switching mechanism 50 is judged based on whether or not the movable amount L of the diaphragm 34 is great. However, the occurrence of the unlinking abnormality may also be judged based on an elapsed time from generation of the first change point Q1 to emergence of the second change point Q2.

Next, a sixth embodiment of the invention will be described with reference to FIGS. 13 and 14.

Figure 13:
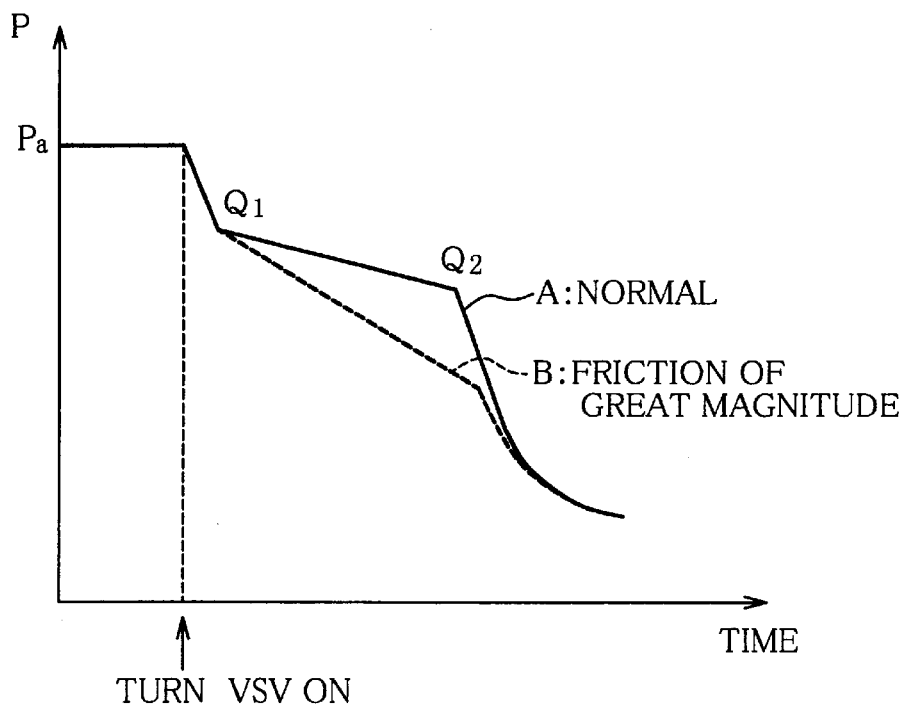
FIG. 13 shows time-dependent changes in feed pressure P when the VSV is turned on, in the case A where the switching mechanism functions normally and in the case B where the switching mechanism undergoes a considerable friction in the course of operation.

FIG. 13 shows an example of time-dependent changes in feed pressure P when the VSV is turned on, in the case A where the switching mechanism functions normally and in the case B where the switching mechanism undergoes a considerable friction in the course of operation. The cases A and B are indicated by a solid line and a broken line respectively.

During the period from the start of deflection of the diaphragm 34 to the end of deflection of the diaphragm 34 after the turning-on of the VSV 44, even if the feed pressure P remains unchanged, the deflection amount of the diaphragm 34 changes in accordance with the friction acting on the switching mechanism 50. As the friction acting on the switching mechanism 50 increases, deflection of the diaphragm 34 becomes more difficult. Hence, as the friction acting on the switching mechanism 50 increases, the decreasing rate of the volume of the aspiration space becomes smaller and the feed pressure P decreases more smoothly. The magnitude of the friction which acts on the switching mechanism 50 while the switching valve 28 is being opened or closed can be judged based on a descending gradient after the start of deflection of the diaphragm 34, that is, after generation of the first change point Q1 on the curve of the feed pressure P.

The change-point-interval time TIME changes in accordance with the friction which acts on the switching mechanism 50 while the switching valve 28 is being opened or closed. To be more specific, as the magnitude of friction increases, the change-point-interval time TIME is lengthened. For this reason, the movable amount L of the diaphragm 34 needs to be determined in consideration of the magnitude of the friction which acts on the switching mechanism 50 while the switching valve 28 is being opened or closed. Thus, in this embodiment, the movable amount L of the diaphragm 34 is determined by referring to a predetermined three-dimensional map based not only on the change-point-interval time TIME and the intake pressure PM as in the aforementioned fifth embodiment but also on the magnitude of the friction which acts on the switching mechanism 50 while the switching valve 28 is being opened or closed.

FIG. 14 is a flowchart of an exemplary control routine executed by the ECU 10 to judge the occurrence of a stroke abnormality in the switching valve 28 and the occurrence of an unlinking abnormality in the switching mechanism 50 in this embodiment. In FIG. 14, the steps for performing processings similar to those of the routines shown in FIGS. 4 and 11 are denoted by the same reference numerals as in FIGS. 4 and 11 and will not be described again. That is, if the result in STEP 348 turns out to be affirmative, the processing in STEP 400 is performed.

In STEP 400, the processing of calculating a descending gradient of the feed pressure P from generation of the first change point Q1 to generation of the second change point Q2 is performed.

In STEP 402, the movable amount L of the diaphragm 34 is calculated based on the descending gradient of the feed pressure P calculated in STEP 400 as well as the change-point-interval time TIME and the intake pressure PM. Even if the movable amount L of the diaphragm 34 remains unchanged, the change-point-interval time TIME is lengthened as the descending gradient of the feed pressure P increases, that is, as the magnitude of the friction which acts on the switching mechanism 50 while the switching valve 28 is being opened or closed increases. In other words, even if the change-point-interval time TIME and the intake pressure PM remain unchanged, the movable amount L of the diaphragm 34 decreases as the descending gradient of the feed pressure P increases.

Upon completion of the processing in STEP 402, the processings in STEP 352 and the following STEPS are performed. These processings make it possible to precisely determine a movable amount L of the diaphragm 34 even if the magnitude of the friction acting on the switching mechanism 50 is great. Therefore, this embodiment makes it possible to precisely judge the occurrence of a stroke abnormality in the switching valve 28 and the occurrence of an unlinking abnormality in the switching mechanism 50 and enhance the precision in judging such abnormalities.

In the sixth embodiment, the magnitude of the friction acting on the switching mechanism 50 is determined based on the descending gradient of the feed pressure P from generation of the first change point Q1 to generation of the second change point Q2. However, the magnitude of the friction fluctuates due to the thermal expansion of the switching mechanism 50. Thus, the magnitude of the friction acting on the switching mechanism 50 may be determined using a temperature of the switching mechanism 50 in place of or in addition to the descending gradient of the feed pressure P. In this case, the system of this embodiment may be designed to detect a temperature of the switching mechanism 50 using the coolant temperature sensor 56 and the intake air temperature sensor 58. In this case, the ECU 10 detects the temperature of the switching mechanism based on output signals from the coolant temperature sensor 56 and the intake air temperature sensor 58, whereby "temperature detector" of the present invention is realized. In the case where sensors for detecting temperatures of exhaust gas and the main catalyst 24 are installed, these temperature may be used to detect a temperature of the switching mechanism 50.

Next, a seventh embodiment of the invention will be described with reference to FIGS. 15 and 16.

Figure 15:
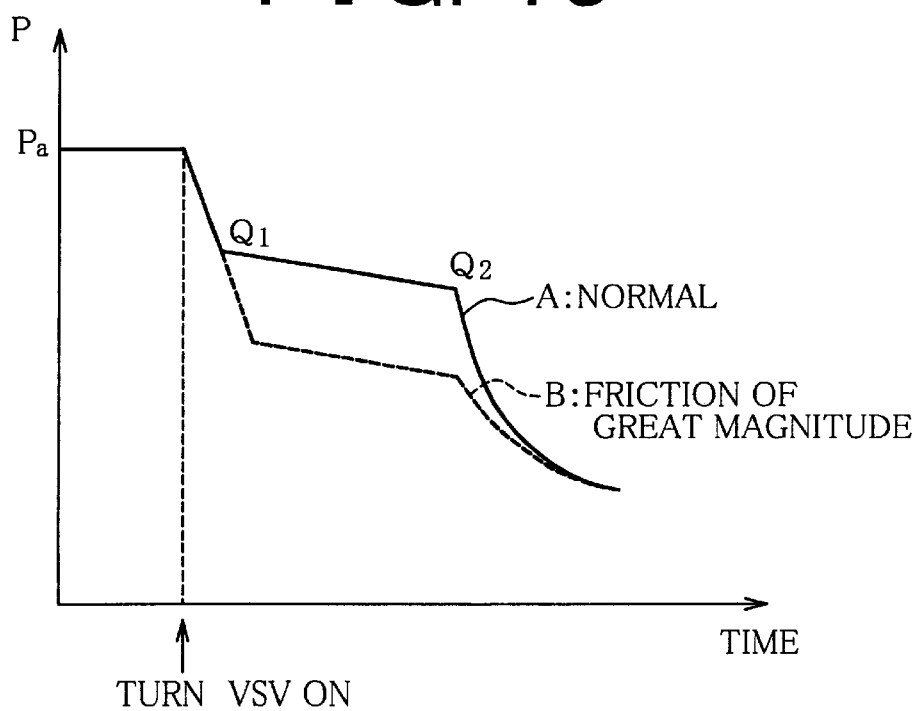
FIG. 15 shows time-dependent changes in feed pressure P when the VSV is turned on, in the case A where the switching mechanism functions normally and in the case B where the switching mechanism undergoes a considerable friction prior to the start of operation.

FIG. 15 shows an example of time-dependent changes in feed pressure P when the VSV is switched from off to on, in the case A where the switching mechanism functions normally and in the case B where the switching mechanism undergoes a considerable friction prior to the start of operation. The cases A and B are indicated by a solid line and a broken line respectively.

Before the diaphragm 34 starts to be deflected after the turning-on of the VSV 44, the switching valve 28, the actuating rod 40 or the diaphragm 34 may undergo an abnormality of entrapment in foreign matters (hereinafter referred to as an entrapment abnormality). If there arises an entrapment abnormality in the switching mechanism 50, deflection of the diaphragm 34 requires a high feed pressure P. Hence, even if the first change point Q1 has been generated on the curve of the feed pressure P, there is a possibility that the negative pressure required for generation of the second change point Q2 may not be supplied to the variable pressure chamber 36 and that the switching valve 28 may not be opened or closed appropriately.

As described above, if there arises an entrapment abnormality in the switching mechanism 50, deflection of the diaphragm 34 requires a high feed pressure P. Thus, the magnitude of the friction acting on the switching mechanism 50 prior to the start of operation can be determined based on the feed pressure P at the time of generation of the first change point Q1 after the turning-on of the VSV 44. Also, the presence or absence of an entrapment abnormality in the switching mechanism 50 can be judged.

Figure 16:
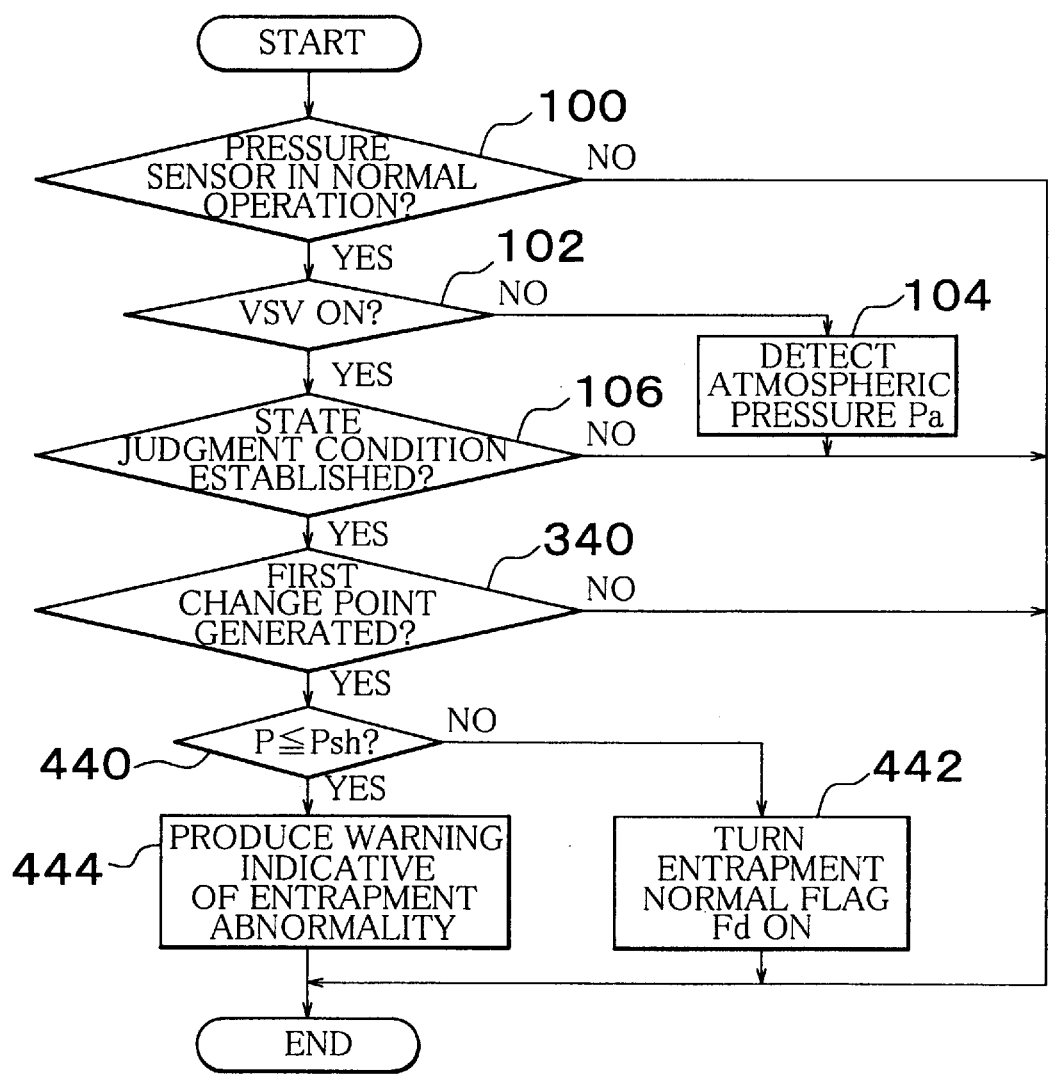
FIG. 16 is a flowchart of a control routine executed by the ECU in a seventh embodiment of the invention.

FIG. 16 is a flowchart of an exemplary control routine executed by the ECU 10 to judge the occurrence of an entrapment abnormality in the switching mechanism 50 in this embodiment. In FIG. 16, the steps for performing processings similar to those of the routine shown in FIGS. 4 and 11 are denoted by the same reference numerals as in FIGS. 4 and 11 and will not be described again. That is, if it is determined in STEP 340 that the first change point Q1 has been generated, the processing in STEP 440 is performed next.

It is determined in STEP 440 whether or not the feed pressure P at the time of generation of the first change point Q1 is equal to or lower than a predetermined threshold value Psh. The predetermined threshold Psh is a lower limit value of the feed pressure P required for generation of the second change point Q2 after generation of the first change point Q1. If the result confirms that the relation $P \leq Psh$ is not established, it can be determined that the feed pressure P required to open and close the switching valve 28 appropriately is ensured. Thus, in the case of such a determination, the processing in STEP 442 is performed next. On the other hand, if the relation $P \leq Psh$ is established, it can be determined that the feed pressure P has decreased to such an extent that the switching valve 28 cannot be opened or closed appropriately. Thus, in the case of such a determination, the processing in STEP 444 is performed next In STEP 442, the processing of turning on an entrapment normal flag Fd is performed. Upon completion of the processing in STEP 442, the present routine is terminated.

In STEP 444, a warning indicative of the occurrence of an entrapment abnormality in the switching mechanism 50 resulting from an increase in friction prior to the start of operation is issued. Upon completion of the processing in STEP 444, the present routine is terminated. The aforementioned processing makes it possible to judge the occurrence of an entrapment abnormality in the switching mechanism 50 based on the feed pressure P at the time of generation of the first change point Q1 on the curve of the feed pressure P.

In the first through seventh embodiments, the description of a stroke abnormality in the switching valve 28 has been made as to the case where the switching valve 28 can only be closed from its full-opening state to its half-opening state. However, there may arise a stroke abnormality wherein the switching valve 28 cannot be opened to its full-opening state. In the case of the occurrence of such a stroke abnormality, the diaphragm 32 is deflected towards the variable pressure chamber 36 even under the circumstance where the VSV 44 has been turned off. Therefore, the aspiration space becomes smaller in volume in comparison with the case where the switching valve 28 assumes its full-opening state. Hence, the feed pressure P decreases with a great gradient when the VSV 44 is turned on, and the first change point Q1 is generated earlier. Thus, the moment of generation of the first change point Q1 is detected, whereby the judgment can be made with various stroke abnormalities being distinguished from one another.

In the first through seventh embodiments, the occurrence of an operational abnormality in the switching valve 28 is judged based on the tendency of changes in feed pressure P after the turning-on of the VSV 44. However, even after the VSV 44 has been switched from on to off, if the switching valve 28 assumes a certain state, the feed pressure P demonstrates a tendency of changes which is obtained by vertically inverting what is shown in FIGS. 2 and 3. Thus, it is possible to judge the occurrence of an abnormality in the switching mechanism 50 even when the VSV 44 is switched from on to off. In other words, the judgment of the occurrence of an abnormality can be made twice by turning the VSV 44 on or off once.

In the case where the occurrence of an abnormality in the switching mechanism 50 is judged based on the feed pressure P after the turning-off of the VSV 44, as the flow resistance at an atmospheric opening of the VSV 44 increases, the gradient of changes in feed pressure P after the turning-off of the VSV 44 decreases. Therefore, the degree of changes in gradient at the first change point Q1 and the second change point Q2 also decreases. On the other hand, as the flow resistance at the atmospheric opening decreases, the feed pressure P increases more smoothly. In this case, the period from generation of the first change point Q1 to generation of the second change point Q2 is shortened, which causes a deterioration in precision of judgment at the time of generation of the second change point Q2. Thus, it is preferable to set the flow resistance (e.g. the opening area) at the atmospheric opening of the VSV 44 to a suitable value so that the first change point Q1 and the second change point Q2 emerge distinctly and that the moment of generation of the second change point Q2 can be determined with high precision.

In the first through seventh embodiments of the invention, the VSV 44, the negative pressure feed line 42 and the variable pressure chamber 36 correspond to "a pressure transmitting portion", the diaphragm 34 to "a moving member", and the intake manifold 16 to "a fluid pressure source" and "an intake passage". In the first through seventh embodiments, the ECU 10 performs the processings in STEPS 118, 122, 124, 126, and 130 through 136 in the routine shown in FIG. 4, the processings in STEPS 200 through 220 in the routine shown in FIG. 6, the processings in STEPS 240 and 242 in the routine shown in FIG. 8, the processings in STEPS 340 through 360 in the routine shown in FIG. 11, the processings in STEPS 400 and 402 in the routine shown in FIG. 14, or the processings in STEPS 440 through 444 in the routine shown in FIG. 16, whereby "controller" of the invention is realized.

In addition, in the first through seventh embodiments, the ECU 10 detects a feed pressure P based on an output signal from the pressure sensor 46 to thereby realize "transmitting portion detector" of the present invention, detects an intake pressure PM based on an output signal from the intake pressure sensor 25 to thereby realize "fluid pressure source pressure detector" of the present invention, determines a magnitude of the friction acting on the switching mechanism 50 during the opening or closing of the switching valve 28 based on a descending gradient after generation of the first change point Q1 on the curve of the feed pressure P to thereby realize "friction detector" of the present invention, and performs the processings in STEPS 302 and 306 to thereby realize "controller" of the present invention.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller judges presence or absence of locking of the switching mechanism based on whether or not there is a period when an absolute value of a gradient of changes in pressure detected by the transmitting portion pressure detector becomes equal to or smaller than a predetermined value within a predetermined period after a start of a switching operation of the exhaust passage by the switching mechanism.

2. The exhaust passage switching unit according to claim 1, wherein:

the controller determines that the switching mechanism is locked, the controller determines a locking position of the switching mechanism based on a gradient of changes in pressure detected by the transmitting portion pressure detector.

3. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller judges presence or absence of locking of the switching mechanism based on whether or not there is a period when an absolute value of a change amount of a gradient of changes in pressure detected by the transmitting portion pressure detector becomes equal to or smaller than a predetermined value within a predetermined period after a start of a switching operation of the exhaust passage by the switching mechanism.

4. The exhaust passage switching unit according to claim 3, wherein:

if the controller determines that the switching mechanism is locked, the controller determines a locking position of the switching mechanism based on a gradient of changes in pressure detected by the transmitting portion pressure detector.

5. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller judges presence or absence of a malfunction in the pressure transmitting portion based on a pressure detected by the transmitting portion pressure detector after lapse of a predetermined length of time since a start of a switching operation of the exhaust passage by the switching mechanism.

6. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller determines an amount of movement of the moving member based on a period from a moment when an absolute value of a change amount of a gradient of changes in pressure detected by the transmitting portion pressure detector becomes equal to or greater than a first predetermined value after a start of a switching operation of the exhaust passage by the switching mechanism to a moment when the absolute value becomes equal to or greater than a second predetermined value.

7. The exhaust passage switching unit according to claim 6, further comprising:

a fluid pressure source pressure detector that detects a pressure of the fluid pressure source, wherein:

the controller determines an amount of movement of the moving member based on a pressure detected by the fluid pressure source pressure detector.

8. The exhaust passage switching unit according to claim 6, further comprising:

a friction detector that detects a friction of the switching mechanism, wherein:

the controller determines an amount of movement of the moving member based on the friction detected by the friction detector.

9. The exhaust passage switching unit according to claim 6, further comprising:

a temperature detector that detects a temperature of the switching mechanism, wherein:

the controller also determines an amount of movement of the moving member based on the temperature detected by the temperature detector.

10. The exhaust passage switching unit according to claim 6, wherein:

the controller judges presence or absence of a malfunction in the switching mechanism based on whether or not an amount of movement of the moving member is equal to or greater than a predetermined threshold value.

11. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller determines a magnitude of friction of the switching mechanism based on a gradient of changes in pressure detected by the transmitting portion pressure detector after an absolute value of a change amount of a gradient of changes in the pressure becomes equal to or greater than a predetermined value since a start of a switching operation of the exhaust passage by the switching mechanism.

12. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller judges presence or absence of a malfunction in the switching mechanism based on an elapsed time after an absolute value of a change amount of a gradient of changes in pressure detected by the transmitting portion pressure detector becomes equal to or greater than a predetermined value since a start of a switching operation of the exhaust passage by the switching mechanism.

13. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the controller judges presence or absence of a malfunction in the switching mechanism based on a pressure detected by the transmitting portion pressure detector when an absolute value of a change amount of a gradient of changes in pressure detected by the transmitting portion pressure detector becomes equal to or greater than a predetermined value after a start of a switching operation of the exhaust passage by the switching mechanism.

14. An exhaust passage switching unit for an internal combustion engine, comprising:

a switching mechanism that includes: (a) a moving member driven by a fluid pressure and (b) a pressure transmitting portion that transmits a fluid pressure of a fluid pressure source to the moving member, wherein the switching mechanism switches an exhaust passage in accordance with a movement of the moving member;

a transmitting portion pressure detector that detects a pressure of the pressure transmitting portion; and a controller that judges a state of the switching mechanism based on the pressure detected by the transmitting portion pressure detector, wherein the fluid pressure source is an intake passage of the internal combustion engine; the controller judges a stability of an internal pressure of the intake passage based on an operating state of the internal combustion engine; and if the controller determines that an internal pressure of the intake passage is stabilized, the controller judges a state of the switching mechanism based on a pressure detected by the transmitting portion pressure detector.

15. A method of judging a state of an exhaust passage switching mechanism in an internal combustion engine, the switching mechanism including a member and a pressure transmitting portion that transmits a fluid pressure of a fluid pressure source to the moving member to cause the moving member to switch the exhaust passage, the method comprising:

detecting the fluid pressure of the pressure transmitting potion; and judging a state of the switching mechanism based on the detected fluid pressure, wherein the state detected is at least one of normal operation, locked, entrapment, friction and malfunction and wherein the state is determined based on an absolute value of a change amount of a gradient of changes in the detected fluid pressure becoming equal to or greater than a predetermined value since a start of the driving of the switching mechanism.

16. A method of judging a state of an exhaust passage switching mechanism in an internal combustion engine, the switching mechanism including a member and a pressure transmitting portion that transmits a fluid pressure of a fluid pressure source to the moving member to cause the moving member to switch the exhaust passage, the method comprising:

detecting the fluid pressure of the pressure transmitting potion; and judging a state of the switching mechanism based on the detected fluid pressure, wherein the state detected is at least on of normal operation, locked, entrapment, friction and malfunction and wherein the state is determined based on an elapsed time after an absolute value of a change amount of a gradient of changes in the detected fluid pressure becoming equal to or greater than a predetermined value since a start of the driving of the switching mechanism.

17. A method of judging a state of an exhaust passage switching mechanism in an internal combustion engine, the switching mechanism including a member and a pressure transmitting portion that transmits a fluid pressure of a fluid pressure source to the moving member to cause the moving member to switch the exhaust passage, the method comprising:

detecting the fluid pressure of the pressure transmitting potion; and judging a state of the switching mechanism based on the detected fluid pressure, wherein the state detected is at least on of normal operation, locked, entrapment, friction and malfunction and wherein the state is determined based on a pressure detected when an absolute value of a change amount of a gradient of changes in the detected fluid pressure becoming equal to or greater than a predetermined value since a start of the driving of the switching mechanism.

* * * * *